(12) United States Patent
Anderson et al.

(10) Patent No.: US 6,177,956 B1
(45) Date of Patent: *Jan. 23, 2001

(54) SYSTEM AND METHOD FOR CORRELATING PROCESSING DATA AND IMAGE DATA WITHIN A DIGITAL CAMERA DEVICE

(75) Inventors: Eric C. Anderson, San Jose; Mike M. Masukawa, Los Gatos, both of CA (US)

(73) Assignee: FlashPoint Technology, Inc., San Jose, CA (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/735,705

(22) Filed: Oct. 23, 1996

(51) Int. Cl.$^7$ ...................................................... H04N 5/76
(52) U.S. Cl. .......................... 348/231; 348/220; 348/207; 348/222
(58) Field of Search .................................... 386/107, 117; 348/207, 220, 221, 231, 232, 233, 239, 576, 577, 222; 358/906, 909.1; 707/1, 200, 100, 104; 345/131, 132, 509, 515, 192, 193; H04N 5/225

(56) References Cited

U.S. PATENT DOCUMENTS

| | | | |
|---|---|---|---|
| 5,065,246 | * 11/1991 | Takemoto et al. | 348/232 |
| 5,153,729 | * 10/1992 | Saito | 348/232 |
| 5,402,170 | 3/1995 | Parulski et al. | 348/211 |
| 5,475,428 | 12/1995 | Hintz et al. | 348/263 |
| 5,475,441 | 12/1995 | Parulski et al. | 348/552 |
| 5,477,264 | 12/1995 | Sarbadhikari et al. | 348/231 |
| 5,493,335 | 2/1996 | Parulski et al. | 348/233 |
| 5,496,106 | * 3/1996 | Anderson | 348/255 |
| 5,633,678 | * 5/1997 | Parulski et al. | 348/231 |
| 5,806,072 | * 9/1998 | Kuba et al. | 348/231 |

OTHER PUBLICATIONS

Martyn Williams, Review–NEC PC–DC401 Digital Still Camera, AppleLink Newbytes, Mar. 15, 1996, pp. 1–3.

* cited by examiner

Primary Examiner—Tuan Ho
(74) Attorney, Agent, or Firm—Sawyer Law Group LLP

(57) ABSTRACT

A system and method for correlating processing data and image data within a digital camera device comprises a capture device for gathering image data, a data cell manager for building a data cell containing processing data and for linking the data cell to the image data, and a processor device for processing and compressing the image data by using the processing data stored within the data cell.

18 Claims, 11 Drawing Sheets

| |
|---|
| Version Number — 800 |
| Verification Constant — 802 |
| Image Name — 804 |
| Image Type — 806 |
| Image Size — 808 |
| User Tags — 810 |
| Folder Name — 812 |
| Image Status Flags — 814 |
| Background Processing Stage — 816 |
| Time/Date Stamp — 818 |
| Delete Request — 820 |
| Stop-Processing Request — 822 |
| Watermark Data — 824 |
| IP Parameters — 826 |
| Image-Capture Setting — 828 |
| Image Data Pointer — 830 |
| Error Code — 832 |
| Miscellaneous — 834 |

76 Data Cell

FIG. 8

SYSTEM AND METHOD FOR CORRELATING PROCESSING DATA AND IMAGE DATA WITHIN A DIGITAL CAMERA DEVICE

BACKGROUND OF THE INVENTION

1. Field of the Invention

The present invention relates in general to digital camera technology and also relates more particularly to a system and method for correlating processing data and image data within a digital camera device.

2. Description of the Background Art

An important digital still-camera performance feature is the number of captured images that can be stored in the camera's finite memory. To maximize the image-carrying capacity of digital still-cameras, it is desirable to compress the images prior to storage. Conventional digital cameras typically perform image processing on the captured raw image data and then use a high-quality image compression routine (such as JPEG) to compress the image data.

Furthermore, digital cameras may frequently be required to capture and concurrently process multiple successive sets of captured image data. Each captured image, however, has important related information which may be needed during the image processing and compression operations, as well as subsequently. Examples of such processing and compression data might include camera settings (e.g., focus, aperture, and white-balance information), time and date of image capture and image processing parameters.

Each captured image potentially has a different set of relevant processing information. Therefore, each captured image within a digital camera may require a separate and unique set of processing data. Furthermore, to permit effective access to these unique sets of processing and compression data, each of the sets of captured image data and the corresponding processing data must be linked together. Efficient access to the processing data at the appropriate time is thus an important feature of modern digital cameras. Therefore, what is needed is an improved system and method for correlating processing data and image data within a digital camera device.

SUMMARY OF THE INVENTION

The present invention is a system and method for correlating processing data and image data within a digital camera device. In the present invention, an imaging device captures an image in response to an image capture request and responsively produces corresponding raw image data which is temporarily stored into a frame buffer. A data cell manager then builds a corresponding data cell containing various types of processing data which the data cell manager links to the captured raw image data. The processing data may include information such as image-capture settings, image size, user tags and image-processing parameters. The data cell is preferably stored in working memory within the camera DRAM.

A first RAM spooler then typically transfers the raw image data into an individual image data file within a RAM disk in the camera DRAM. Next, the data cell manager makes a copy of the data cell in working memory and places the copy into the image data file stored in the RAM disk for recovery purposes. The image data in the frame buffer is then deleted to allow a camera user to capture another image.

A first flash spooler next transfers the raw image data file from the RAM disk to a flash memory which preferably is a removable flash disk. An image processor device then accesses, processes and compresses the raw image data using the corresponding processing data stored in the data cell. The image processor device may then directly store the compressed data into a compressed image data file on the RAM disk, or alternately, a second RAM spooler may store the compressed image data into a compressed image data file on the RAM disk. The cell manager then stores selected necessary processing data from the corresponding data cell into the compressed image file. The cell manager also deletes unnecessary processing data from the data cell stored in working memory. A second flash spooler then transfers the compressed image data file from the RAM disk to the flash memory.

The data cell thus allows specific camera settings which exist at image capture time to be effectively saved and linked to the corresponding image data, thereby permitting subsequent changes of the camera settings without losing those camera settings previously saved in the data cell. The present invention also allows the camera device to recover from disruptive events such as power failures which threaten to damage the captured image data. Following a disruptive event, the data cell manager may locate the copy of the data cell which is stored in the image data file and then use this copied data cell to rebuild the original data cell stored within working memory in the camera DRAM. Once the original data cell has been reconstructed, the camera may then successfully complete the processing, compression and storage operations for the captured image data.

BRIEF DESCRIPTION OF THE DRAWINGS

FIG. 8 is a block diagram of the preferred embodiment for an exemplary data cell according to the present invention;

DETAILED DESCRIPTION OF THE PREFERRED EMBODIMENT

The present invention comprises a system and method for correlating processing data and image data within a digital camera device and includes an imaging device for capturing image data, a data cell manager for building a data cell containing processing data and for linking the data cell to the captured image data, and a processor device for processing and compressing the captured image data by using the processing data stored within the data cell.

Figure 1:
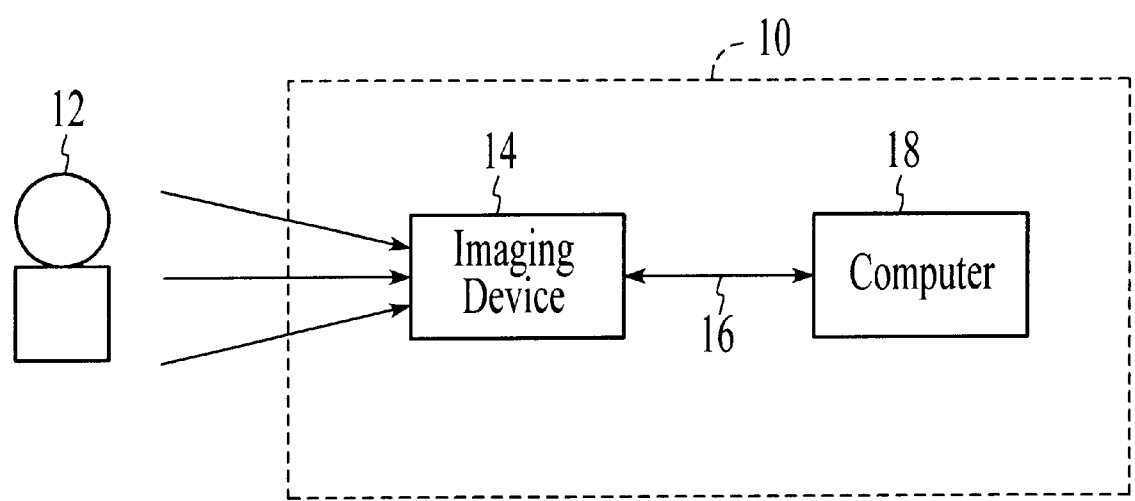
FIG. 1 is a block diagram showing a digital camera device according to the present invention.

Referring now to FIG. 1, a block diagram of a preferred embodiment of a camera 10 is shown. Camera 10 may be used to capture a set of image data representing an object 12. Camera 10 preferably comprises an imaging device 14, an external bus 16 and a computer 18. Imaging device 14 is optically coupled to object 12 and electrically coupled via external bus 16 to computer 18. Once a photographer has focused imaging device 14 on object 12 and, using a capture button or some other means, instructed camera 10 to capture an image of object 12, computer 18 commands imaging device 14 via external bus 16 to capture raw image data representing object 12. The captured raw image data is transferred over external bus 16 to computer 18 which performs various image processing functions on the image data before storing it in its internal memory. External bus 16 also passes various status and control signals between imaging device 14 and computer 18.

Figure 2:
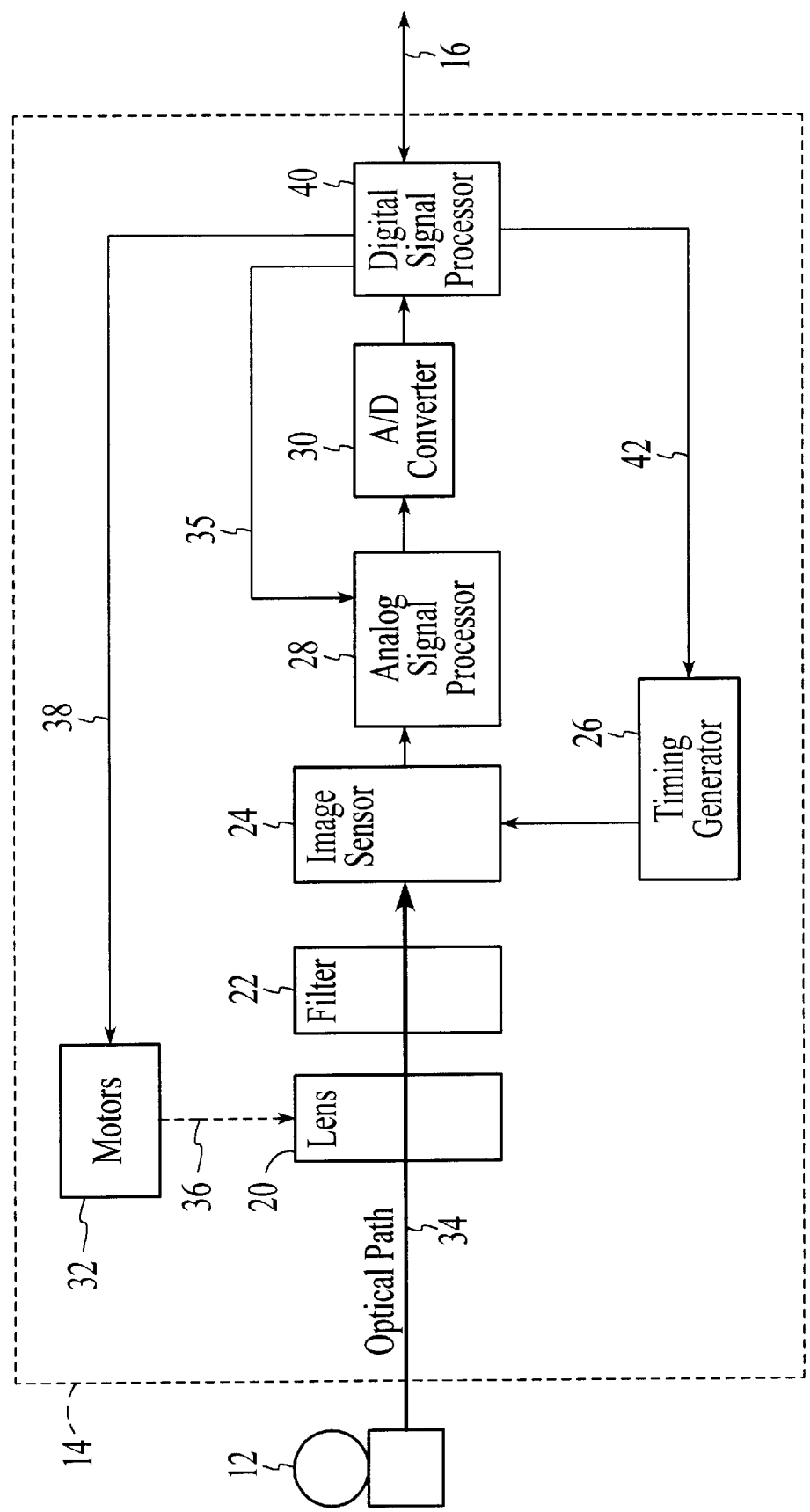
FIG. 2 is a block diagram showing a preferred embodiment of the FIG. 1 imaging device according to the present invention.

Referring now to FIG. 2, a block diagram of a preferred embodiment of imaging device 14 is shown. Imaging device 14 preferably comprises a lens 20 having an iris, a filter 22, an image sensor 24, a timing generator 26, an analog signal processor (ASP) 28, an analog-to-digital (A/D) converter 30, a digital signal processor (DSP) 40, and one or more motors 32.

In operation, imaging device 14 captures an image of object 12 via reflected light impacting image sensor 24 along optical path 34. Image sensor 24 responsively generates a set of raw image data representing the captured image 12. The raw image data is then routed through ASP 28, A/D converter 30 and DSP 40. DSP 40 has outputs coupled to lines 35, 38 and 42 for controlling ASP 28, motors 32 and timing generator 26. From DSP 40, the raw image data passes over external bus 16 to computer 18.

Figure 3:
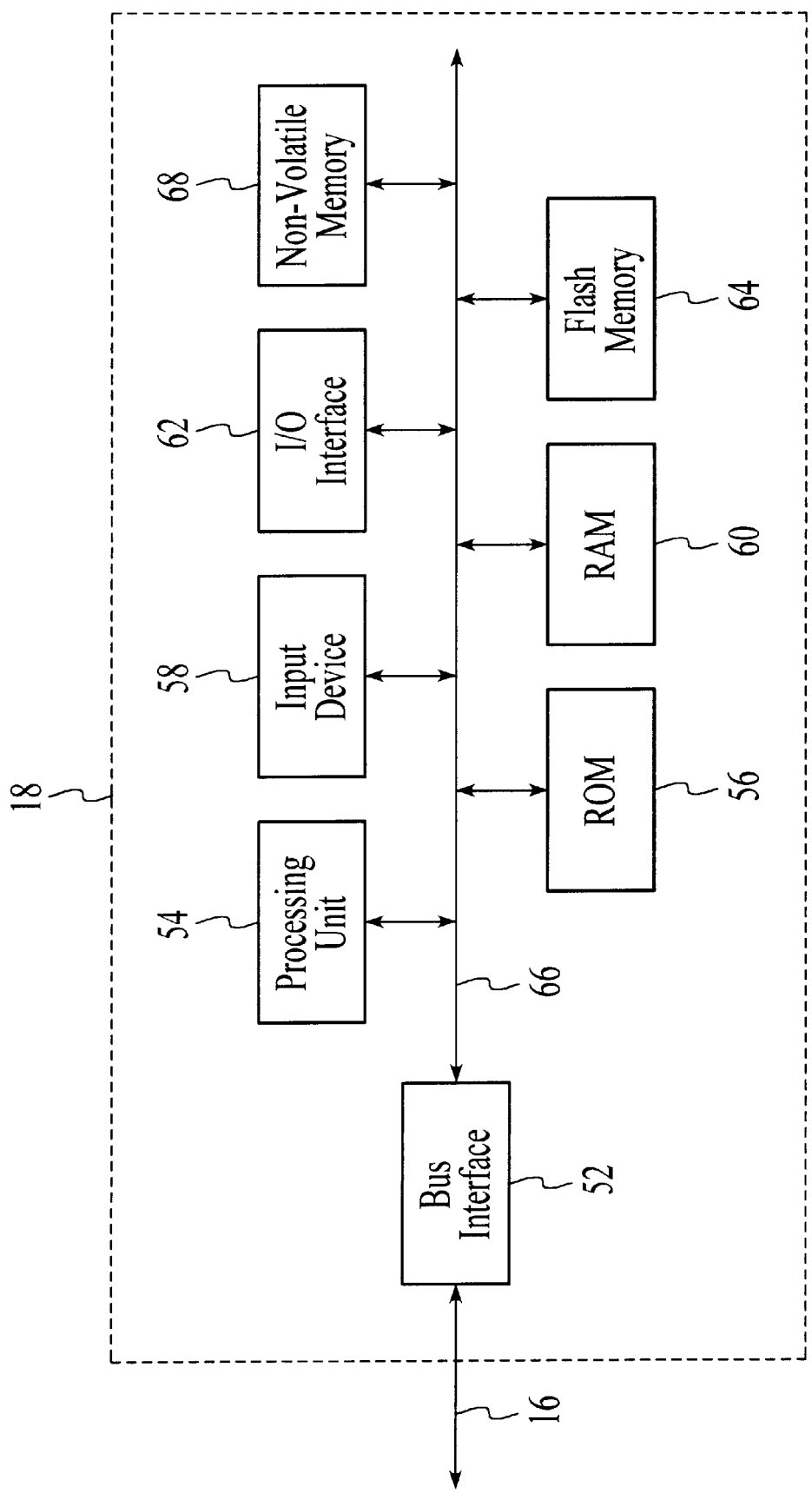
FIG. 3 is a block diagram showing a preferred embodiment of the FIG. 1 computer of the present invention.

Referring now to FIG. 3, a block diagram of a preferred embodiment of computer 18 is shown. Computer 18 comprises a bus interface 52, a processing unit 54, a read-only memory (ROM) 56, an input device 58, a random access memory (RAM) 60, an I/O interface 62, a flash memory 64 and a non-volatile memory 68 coupled together via an internal bus 66. In the preferred embodiment, computer 18 is embedded as part of camera 10 using a conventional architecture. However, those skilled in the art will recognize that in an alternate embodiment, computer 18 may be a discrete computer system.

Bus interface 52 is preferably a bi-directional first-in, first-out interface for receiving the raw image data and imaging device 14 control signals passed between computer 18 and DSP 40. Interface 52 has data lines coupled to both external bus 16 and internal bus 66. Processing unit 54 executes programming instructions stored in ROM 56 and RAM 60 to perform various operations. ROM 56 stores a set of computer readable program instructions which control how processing unit 54 accesses, transforms and outputs the image data. While ROM 56 is employed as a conventional non-volatile memory device for practicing the present invention, those skilled in the art will recognize that in alternate embodiments ROM 56 could be replaced with a functionally equivalent computer useable medium such as a compact disk and drive, a floppy disk and drive, or a flash memory.

Input device 58 preferably comprises a series of control buttons which generate signals translated by processing unit 54 into an image capture request, an operating mode selection request, and various control signals for imaging device 14. In an alternate embodiment in which computer 18 is a discrete computer system, input device 58 also includes a keyboard and mouse-type controller.

I/O Interface 62 is coupled to internal bus 66 and has an external port connector for coupling computer 18 with a host computer (not shown) for downloading image data stored in RAM 60 and/or flash memory 64. At the user's choice or when camera 10 is completely filled with image data, I/O Interface 62 enables the image data to be down-loaded, thus freeing up storage space for future sets of image data.

Flash memory 64 serves as an additional image data storage area and is preferably a non-volatile device, readily removable and replaceable by a user. Thus, a user who possesses several flash memories 64 may replace a full flash memory 64 with an empty flash memory 64 to effectively expands the picture taking capacity of camera 10. In the preferred embodiment of the present invention, flash memory 64 is a flash disk. Non-volatile memory 68 stores an image counter whose current value becomes an identifier for each new set of image data captured by camera 10. The counter is preferably incremented each time a new image is captured. In the preferred embodiment, non-volatile memory 68 is either an EEPROM or a battery-backed SRAM.

Figure 4:
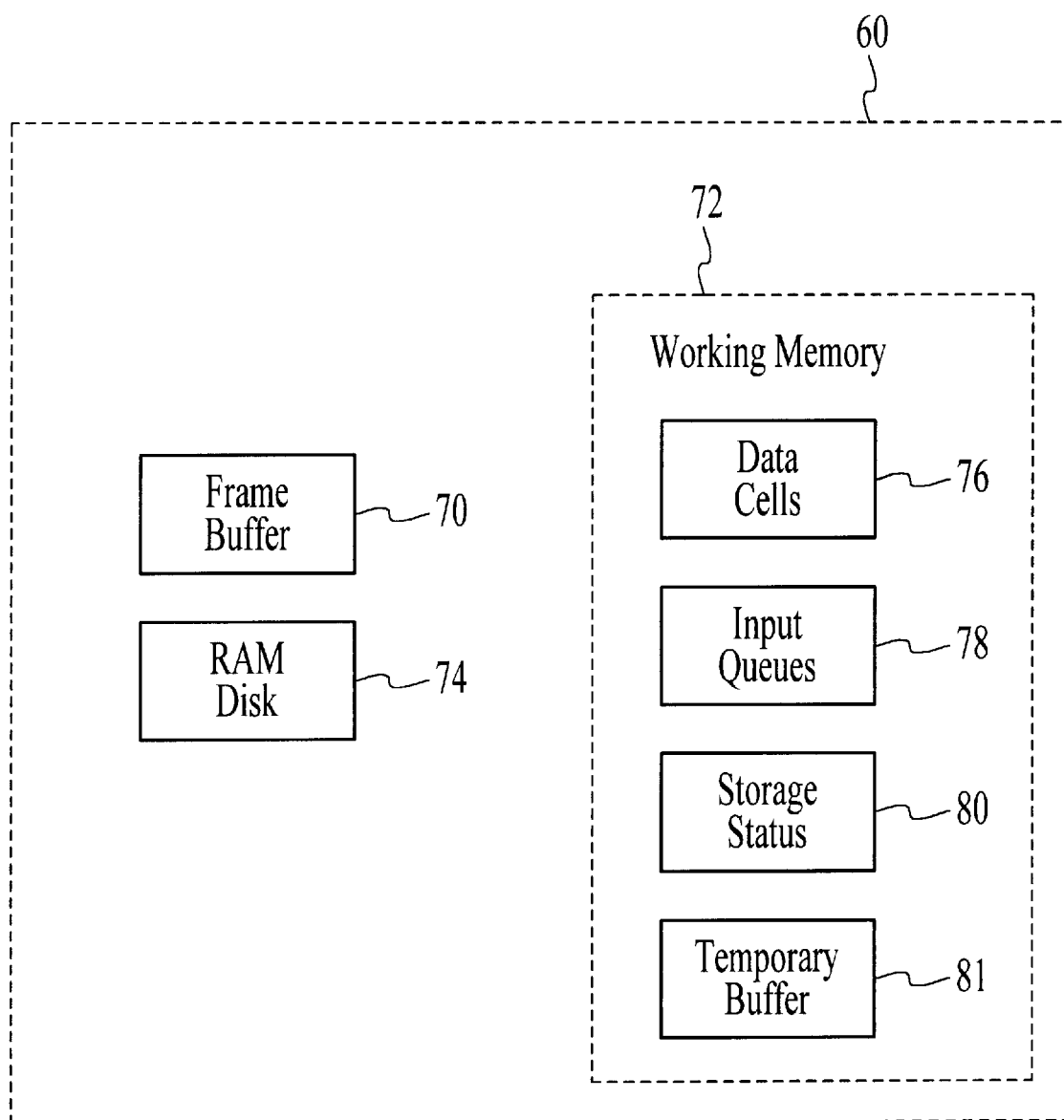
FIG. 4 is a block diagram showing a preferred embodiment of a Random Access Memory (RAM) of the FIG. 3 computer.

Referring now to FIG. 4, a block diagram of a preferred embodiment of RAM 60 is shown. RAM 60 is comprised of a frame buffer 70, a working memory 72 and a RAM disk 74. Frame buffer 70 preferably comprises a dedicated space of contiguous memory suitable for storing the raw image data generated by image sensor 24. In alternate embodiments, frame buffer 70 may be memory space allocated within working memory 72. The function of frame buffer 70 is to store the most recently captured set of raw image data until computer 18 either stores the raw image data in RAM disk 74 or transfers it to an image processing unit.

RAM disk 74 is a memory area within RAM 60 organized in a "sectored" format similar to that of conventional hard disk drives. The RAM disk 74 function is to store image data. RAM disk 74, in conjunction with flash memory 64, sets the maximum image holding capacity of camera 10. Once both flash memory 64 and RAM disk 74 have been filled with compressed image data, the insertion of a new flash memory 64 or down-loading the image data via I/O interface 62 will enable camera 10 to continue capturing new images.

Working memory 72 is comprised of data cells 76, input queues 78, storage status 80 and temporary buffer 81. Data cells 76 are data structures and each data cell 76 is uniquely associated with particular captured image data. A data cell 76 is comprised of a plurality of data cell elements which are further described below in conjunction with FIG. 8. Input queues 78 are data structures comprised of a plurality of data cell "pointers" each corresponding to data cells 76. In the preferred embodiment, input queues operate on a first-in/first-out basis.

Storage status 80 is a data structure describing the remaining available memory in both RAM disk 74 and flash memory 64. Storage status 80 contains the following four conditional variables: "RAM Disk Raw File Space," "RAM Disk Compressed File Space," "Flash Memory Raw File Space" and "Flash Memory Compressed File Space." Each of the four conditional variables is set to one of three values: FULL, ALMOST FULL or OK. If the variable is set to "OK," then space is available for that particular file type (i.e., a raw file or a compressed file) on that particular storage resource (i.e., RAM disk 74 or flash memory 64). If the variable is set to "ALMOST FULL" then space is not currently available for that particular file type on that particular storage resource, but there will be space in the future. If the variable is set to "FULL" then, absent an increase in available space on storage resources (due, for example, to downloading data or replacing storage units), no space is available for that particular file type on that particular storage resource, nor will space be available in the future. Temporary buffer 81 of working memory 72 is provided for temporarily storing data and/or program code.

Figure 5:
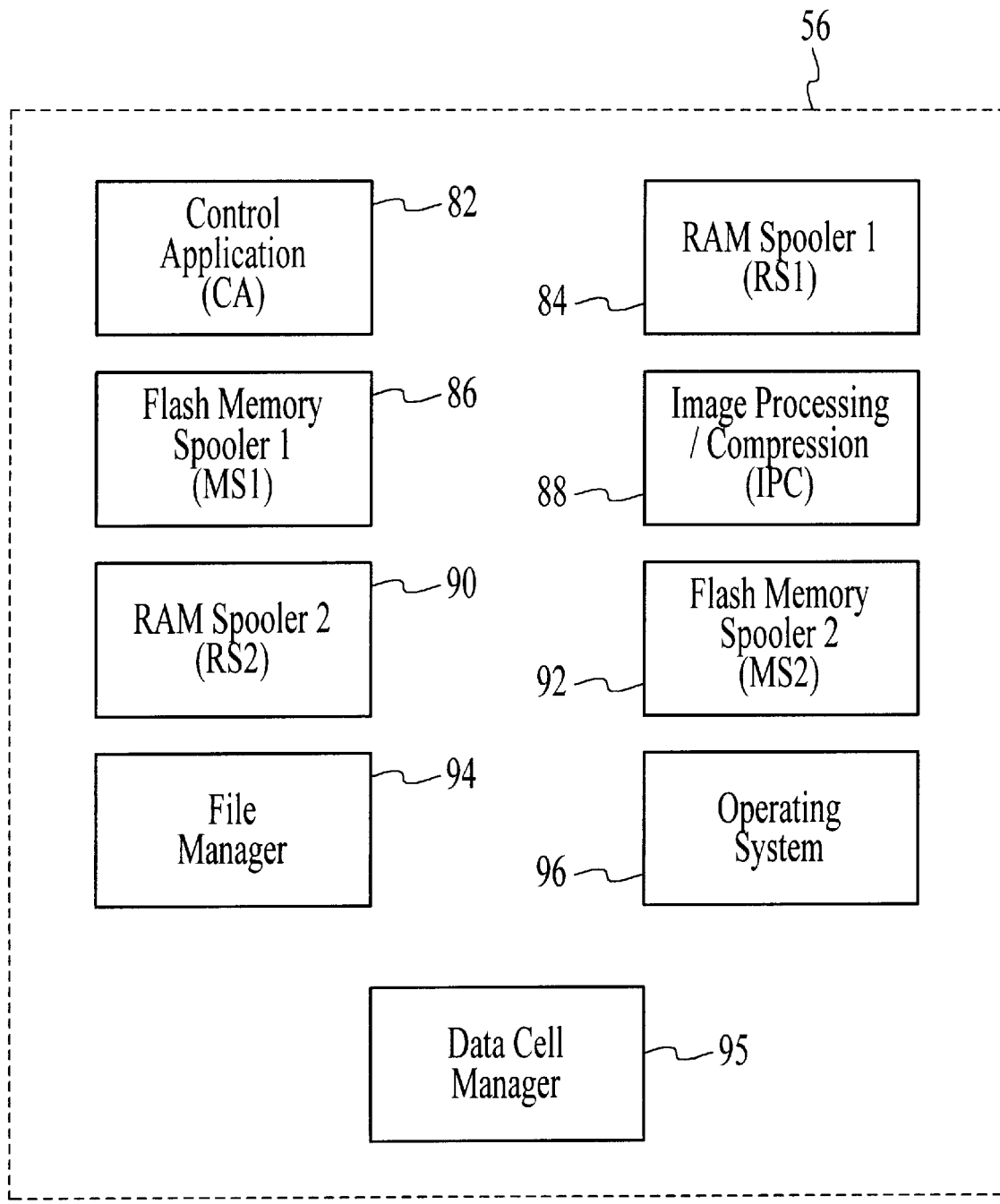
FIG. 5 is a block diagram showing a preferred embodiment of a Read Only Memory (ROM) of the FIG. 3 computer.

Referring now to FIG. 5, a block diagram of a preferred embodiment of ROM 56 is shown. ROM 56 preferably contains code for processes 82 through 96, including a control application (CA) 82, a RAM spooler 1 (RS1) 84, a flash memory spooler 1 (MS1) 86, image processing/compression (IPC) 88, a RAM spooler 2 (RS2) 90, a flash memory spooler 2 (MS2) 92, a file manager 94, a data cell manager 95 and an operating system 96. In alternate embodiments, the FIG. 5 processes 82 through 96 may be stored in various computer memory types other than ROM 56.

A "spooler" is herein defined as a routine for transferring data from one process or device to a second process or device. RAM spooler 1 (84) transfers raw image data into RAM disk 74, and flash memory spooler 1 (86) transfers raw image data into flash memory 64. RAM spooler 2 (90) transfers compressed image data into RAM disk 74 or to I/O interface 62, and flash memory spooler 2 (92) transfers compressed image data into flash memory 64.

Control application 82 preferably comprises program instructions for controlling the operation of camera 10 which are executed using processing unit 54. For example, control application 82 controls data cell manger 95 to create and maintain data cells 76. Image processing/compression 88 compresses the raw image data to maximize the image-carrying capacity of camera 10, and also processes the raw image data to permit readily displaying the captured image data on a host computer. In the preferred embodiment, processes 82 through 96 are comprised of a series of software steps implemented on top of a multithreaded operating system and may therefore run in parallel operation. Data cell manager 95 controls and coordinates data cells 76 and is further discussed below in conjunction with FIGS. 7 through 10.

Figure 6:
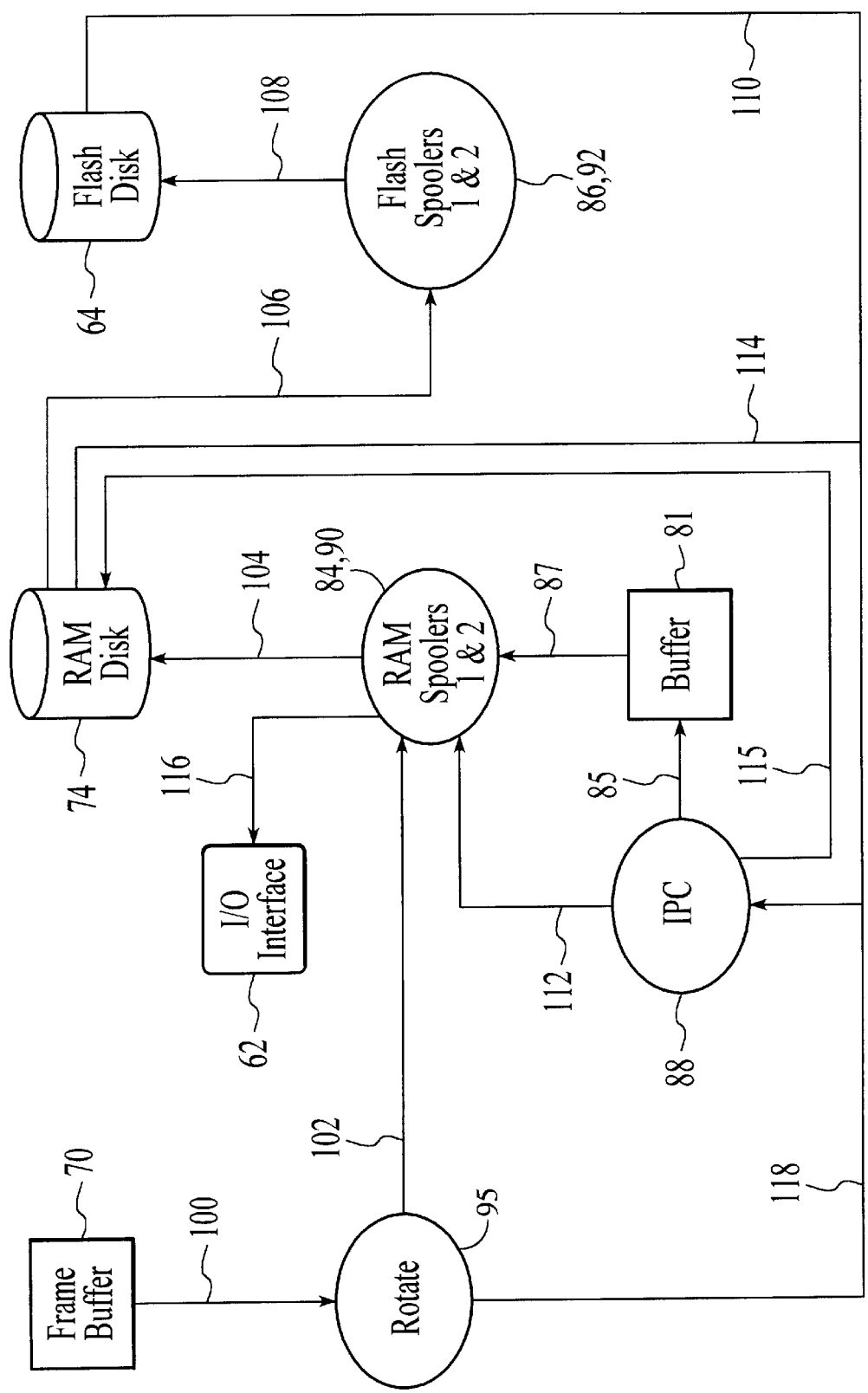
FIG. 6 is a block diagram showing a preferred embodiment of the FIG. 1 camera device according to the present invention.

Referring now to FIG. 6, a block diagram of the preferred embodiment for camera 10 is shown. In FIG. 6, frame buffer 70 receives and stores raw image data previously captured by imaging device 14. Frame buffer 70 then provides the raw image data via line 100 to rotate process 95.

Process 95 rotates the captured image if necessary and then transfers control of the raw image data to RAM spooler 1 (84) using line 102. Alternately, if RAM disk 74 is full, rotate process 95 may transfer control of the raw image data directly to image processing/compression (IPC) 88 using line 118. If RAM spooler 1 (84) receives control of the raw image data, it then stores the raw image data into RAM disk 74 using line 104.

Flash spooler 1 (86) may then access the raw image data from RAM disk 74 via line 106 and store it into flash memory 64 using line 108. Alternately, if flash memory 64 is full, RAM disk 74 may provide the raw image data directly to IPC 88 using line 114. If flash spooler 1 (86) stores the raw image data into flash memory 64, then IPC 88 typically accesses the stored raw image data using line 110 and processes the raw data to responsively obtain compressed image data.

IPC 88 may bypass RAM spooler 2 (90) and store the compressed data directly to RAM disk 74 via line 115, or alternately, if RAM disk 74 is temporarily full, IPC 88 may write the compressed data to temporary RAM buffer 81 via line 85. RAM spooler 2 (90) may then access the compressed image data via line 87 and write the accessed data into RAM disk 74 via line 104. RAM spooler 2 (90) may also download the compressed image data to I/O interface 62 using line 116. Once the compressed data is in RAM disk 74, flash spooler 2 (92) then accesses the data via line 106 and writes the compressed data into flash memory 64.

The present invention may thus process and store a sequence of captured images received from imaging device 14. Although the above example traces the typical data path for a single captured image, the present invention may readily operate on a plurality of captured images progressing through various stages of camera 10. Therefore, multiple sets of image data may exist simultaneously within computer 18. The current processing stage for a specific set of image data is preferably indicated by flags located in the image data's unique data cell 76.

Figure 7:
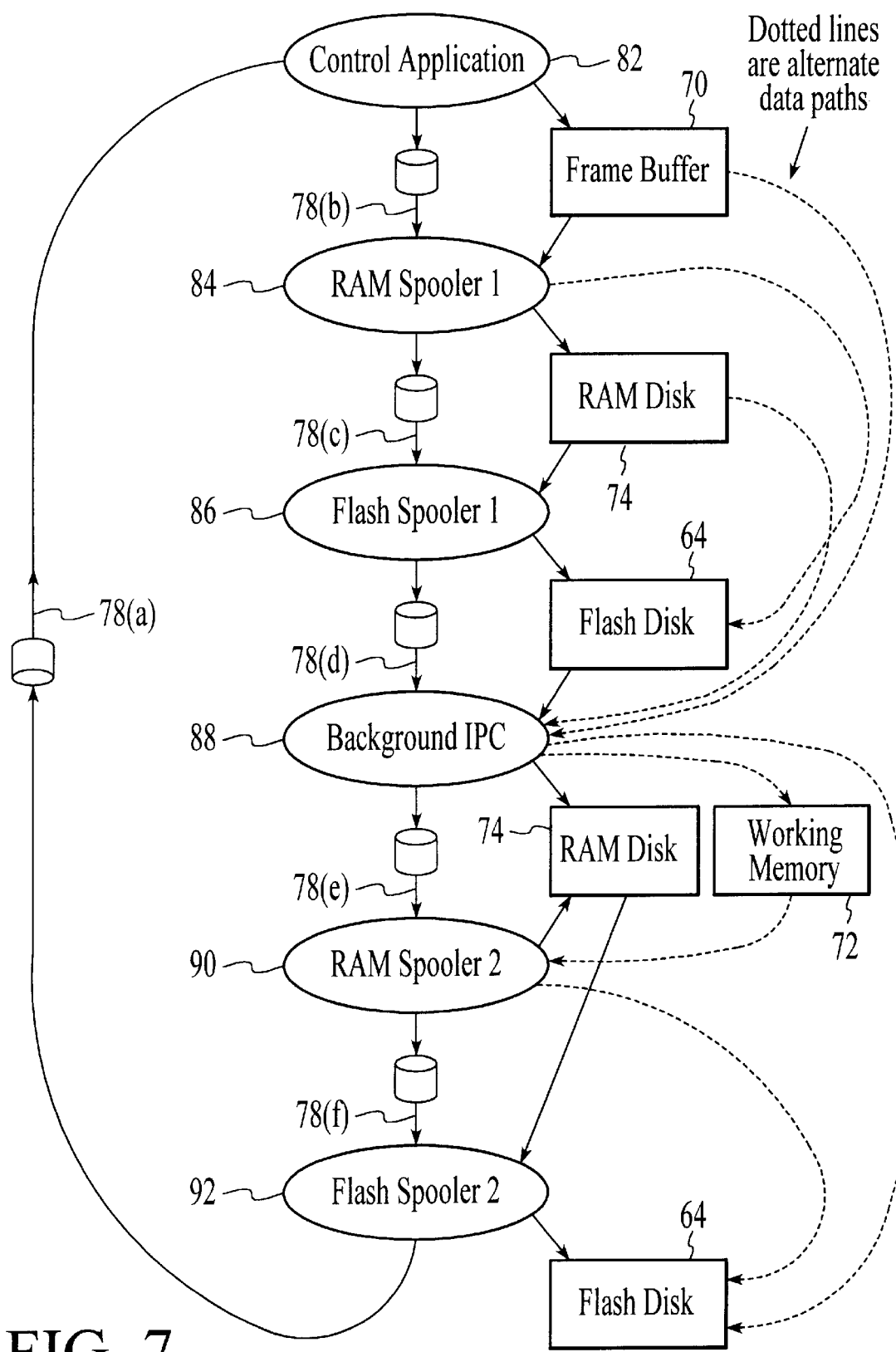
FIG. 7 is a block diagram showing priority levels of preferred processes and corresponding image data paths.

Referring now to FIG. 7, a block diagram of priority levels for processes 84 through 92 of the preferred embodiment is shown. Background processes 84 through 92 are preferably allotted processing unit 54 time depending on their priority level. This priority level is related to the goal of rapidly emptying frame buffer 70 to enable rapid capture of successive sets of image data.

Control application 82 transfers raw image data from imaging device 14 to frame buffer 70 and may supersede any of background processes 84 through 92. The background process with the highest priority is RAM spooler 1 (84) which moves raw image data out of frame buffer 70 to RAM disk 74. The second highest priority is flash memory spooler 1 (86) which moves raw image data out of RAM disk 74 to flash memory 64. The third highest priority is Image Processing/Compression 88 which accesses raw image data and responsively processes and compresses the image data before storing it as compressed image data into RAM disk 74, or if RAM disk 74 is full, into temporary RAM buffer 81 of working memory 72. The fourth highest priority is RAM spooler 2 (90) which, if necessary, may move compressed image data out of working memory 72 into RAM disk 74. The lowest priority is flash memory spooler 2 (92) which moves the compressed image data out of RAM disk 74 into flash memory 64. Those skilled in the art will recognize that either a greater or a lesser number of priority levels than the preferred five may be used in the present invention. Also, alternate embodiments may establish different criteria for routing the captured image data, depending upon memory resources available and/or the maximum image capture rate desired. File manager process 94 and operating system process 96 are not assigned specific priority levels since they either operate in the background or under interrupt conditions.

Processes 82 through 92 preferably each has a respective input queue 78(*a*) through 78(*f*) which operates on a first-in/first-out basis. If one of processes 82 through 92 has a data cell 76 pointer in its input queue, then only that process can access and perform operations on the image data associated with that particular data cell 76. The data cell pointers are passed between processes 82 through 92 in a specific order until the original raw image data has been fully processed, compressed and stored in a memory resource.

The priority level scheme introduced above may "block" one or more processes 84 through 92 even though a data cell 76 pointer is in its input queue 78. For example, since moving raw image data out of frame buffer 70 has the highest priority, if a user repeatedly captures images in rapid succession, RAM spooler 1 (84) will continue to operate until RAM disk 74 becomes filled with raw image data. While RAM spooler 1 (84) is operating, all of the other lower priority processes 86 through 92 will be "blocked" (i.e., idled), even though some of the lower priority processes 86 through 92 may still have data cell 76 pointers in their input queues 78. This blocking of lower priority processes applies to all priority levels. For example, operation of flash memory spooler 1 (86) will block image processing/compression 88, RAM spooler 2 (90) and flash memory spooler 2 (92), and operation of image processing/compression 88 will block RAM spooler 2 (90) and flash memory spooler 2 (92), and so on, until the image data has been fully processed, compressed and stored in memory. Furthermore, if a lower priority ROM process is currently operating and a higher priority ROM process requires processing unit 54, then the lower priority ROM process is immediately blocked until the higher priority ROM process has completed its operations.

Referring now to FIG. 8, a block diagram of the preferred embodiment for an exemplary data cell 76 is shown. In the preferred embodiment, data cell manager 95 allocates a structure and then builds a separate data cell 76 to correspond with each set of captured image data. An exemplary data cell 76 typically includes data cell elements 800 through 834, however various additional data cell elements may alternatively be included by data cell manager 95.

Version number 800 indicates which version of data cell 76 is presently in use, so that data cell manager 95 can work with more than one version of data cell 76. Verification constant 802 is a known constant value used as a check by data cell manager 95 to verify the validity of the data comprising data cell 76. Image name 804 identifies the particular captured image which corresponds to data cell 76. Image name 804 is of the preferred form "IMXXXXXX," where "XXXXXX" is the image number. In the preferred embodiment, the image number "XXXXXX" is not reset, so when images are down-loaded to a host computer, the down-loaded image names 804 will not conflict with image names 804 of image files previously downloaded to the host computer. However, in an alternate embodiment the image number "XXXXXX" could be reset each time image data is down-loaded from camera 10. Also the "IM" in the image identifier may be replaced with "IO."

Image type 806 specifies the format of the captured image. The image type 806 is typically in the form "YYY," is preferably either CFA or JPG which both refer to sets of compressed image data. Image size 808 includes information about the height and width (number of pixels) of the corresponding captured image. Image processing and compression (IPC) 88 uses image size 808 to correctly process a given set of captured image data. User tags 810 include a variety of tags which may be set by a camera 10 user. For example, a user may set a specific user tag 810 to identify whether a particular captured image is a time-lapse image.

Folder name 812 contains the name of the specific folder in which a particular captured image file resides. Image status flags 814 contain information about how much image processing has been performed on the corresponding image data (e.g., whether the image data is raw or compressed data, and whether the image data is in frame buffer 70, RAM 60, temporary buffer 81 or flash disk 64). The image status flags 814 store either a "Raw Image Data In Frame Buffer" flag, a "Raw Image Data In RAM Disk" flag, a "Compressed Image Data In RAM Disk" flag, a "Raw Image Data In Flash memory" flag, a "Compressed Image Data In Flash memory" flag, or a "Compressed Image Data In Temporary Buffer" flag. Background processing stage 816 indicates the current stage of the image data within the background spooling processes 84 through 92 (FIG. 7).

Time/date stamp 818 contains data identifying the time and date that the image data was captured by camera 10. If selected, delete request 820 causes the corresponding image file to be deleted from camera 10. If selected, stop-processing request 822 causes camera 10 to complete the current process and then to temporarily suspend further processing of the corresponding image data. Watermark data 824 selects a particular watermark image and also specifies where the selected watermark is placed on the captured image.

Image processing (IP) parameters 826 contain information which IPC 88 uses during processing of the corresponding image data. For example, IP parameters 826 may include the compression level and color depth for a particular captured image. Image-capture settings 828 may include the various camera 10 settings which existed when the corresponding image data was captured. For example, image-capture settings 828 may include camera 10 focus values, shutter speed, aperture, white-balance settings and exposure values.

Image data pointer 830 is a pointer to identify the location of the captured image data which corresponds to data cell 76. Error code 832 stores information to indicate whether processing of the image data was successful for each of the background spooling processes 84 through 92. Miscellaneous 834 contains a variety of "housekeeping" information used by data cell manager 95 to control and coordinate the function of exemplary data cell 76.

Figure 9A:
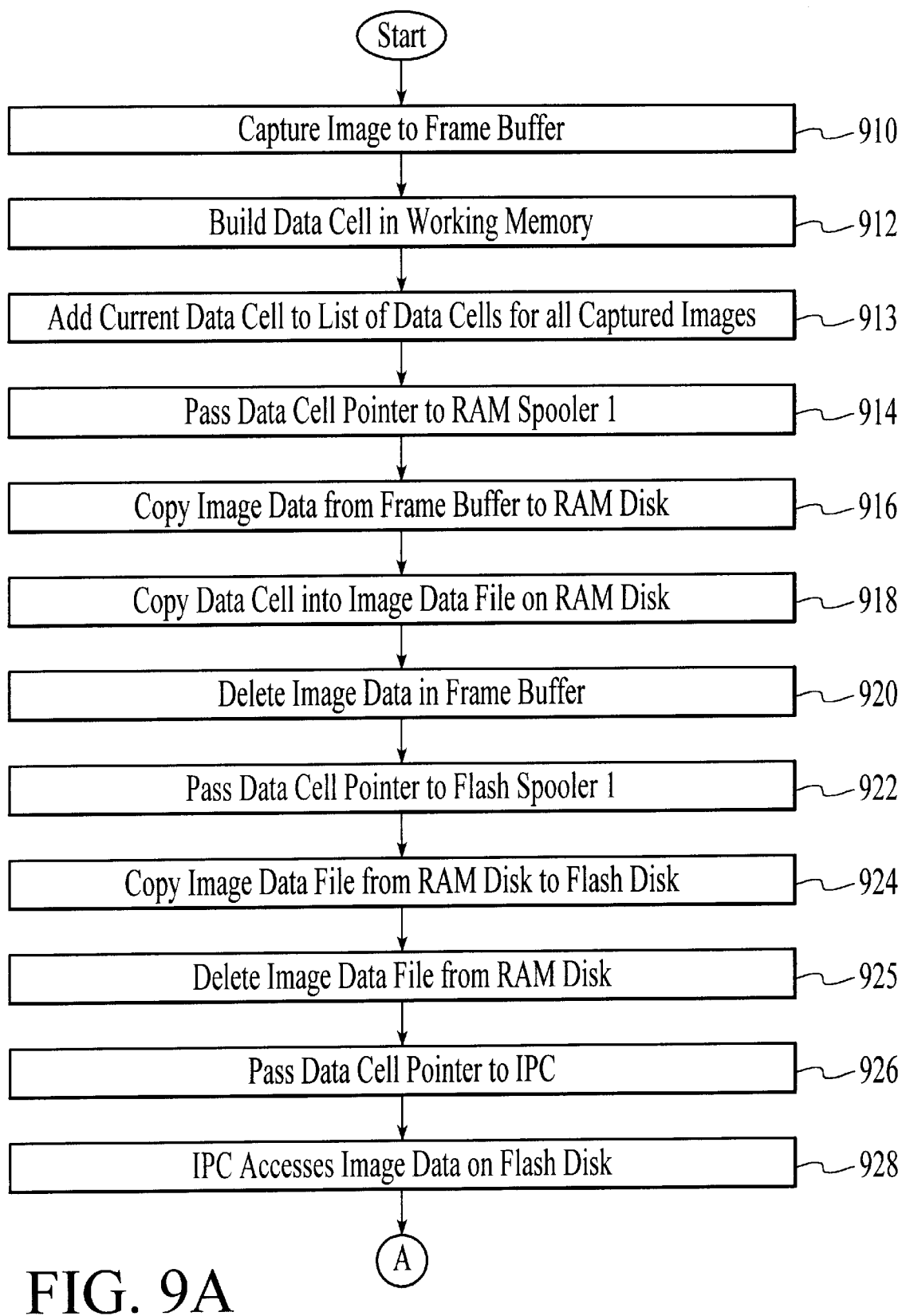
FIG. 9A is the initial portion of a flowchart showing the operation of the present invention using the data cell of FIG. 8.

Referring now to FIG. 9A, the initial portion of a flowchart showing the preferred operation of the present invention is shown. Initially, camera 10 captures 910 a selected image and stores the captured image data into frame buffer 70. Data cell manager 95 responsively builds 912 a data cell 76 in working memory 72 as described above in conjunction with FIG. 8. Data cell manager 95 then adds 913 the data cell 76 to a data cell list identifying data cells 76 for all captured images. To subsequently access a given captured image, data cell manager 95 typically identifies the data cell 76 for the given image and then locates the corresponding image data file. Next, data cell manager 95 generates a pointer to the location of data cell 76 in working memory 72, and then passes 914 the generated data cell 76 pointer to RAM spooler 1 (84) by placing the data cell 76 pointer in the RAM spooler 1 (84) input queue 78(b).

RAM spooler 1 (84) then copies 916 the captured image data from frame buffer 70 to RAM disk 74 to create an image data file. Next, data cell manager 95 makes 918 a copy of the data cell 76 located in working memory 72 and places the data cell 76 copy into the newly-created image data file on RAM disk 74. RAM spooler 1 (84) then deletes 920 the image data from frame buffer 70.

Next, data cell manager passes 922 the generated data cell 76 pointer to flash spooler 1 (86) by placing the data cell 76 pointer in the flash spooler 1 (86) input queue 78(c). Flash spooler 1 (86) then copies 924 the image data file from RAM disk 74 to flash disk 64 and deletes 925 the image data file from RAM disk 74. Next, data cell manager 95 passes 926 the data cell 76 pointer to image processing/compression (IPC) 88 by placing the data cell 76 pointer in the IPC 88 input queue 78(d). IPC 88 then accesses 928 the image data stored in flash disk 64 to begin the processing and compressing operations. The FIG. 9A method then proceeds to FIG. 9B.

Figure 9B:
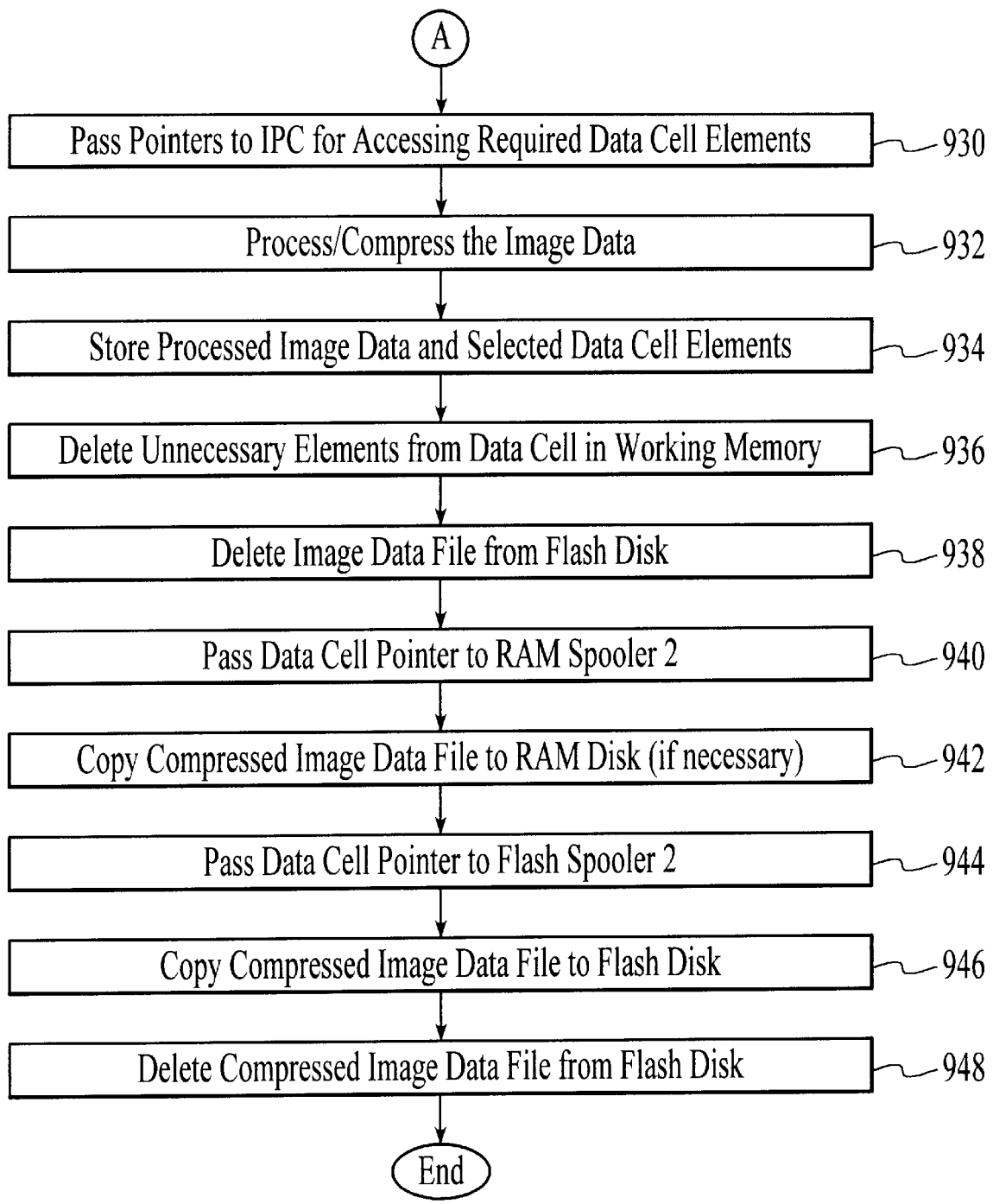
FIG. 9B is the final portion of a flowchart showing the operation of the present invention using the data cell of FIG. 8.

Referring now to FIG. 9B, the final portion of a flowchart showing the operation of the present invention is shown. Continuing the process steps of FIG. 9A, data cell manager 95 passes 930 to IPC 88 a number of pointers for locating specified data cell 76 elements. In the preferred embodiment, the specified data cell 76 elements typically may include IP parameters 826, image size 808, watermark data 824 and image-capture settings 828. IPC 88 responsively uses these received pointers to locate and access those specified data cell 76 elements which are needed to effectively process and compress the captured image data.

IPC 88 then advantageously uses this information accessed from data cell 76 to process and compress 932 the captured image data. Next, IPC 88 stores 934 the processed and compressed image data into an image data file in RAM disk 74, if space is available. If no space is currently available in RAM disk 74, IPC 88 temporarily stores the compressed image data into another available memory location, such as temporary buffer 81 in working memory 72. In step 934, data cell manager 95 also stores selected data cell 76 elements into the compressed image data file created and stored by IPC 88. Data cell manager 95 thus modifies the copy of data cell 76 that was placed into the raw image data file during step 918. In the preferred embodiment, the selected data cell 76 elements which data cell manager 95 incorporates into the compressed image data file typically may include image name 804, image type 806, image size 808, user tags 810, folder name 812, time/date stamp 818, IP parameters 826, watermark data 824 and image-capture settings 828.

Data cell manager 95 then deletes 936 unnecessary elements from data cell 76 in working memory 72 to conserve storage space within DRAM 60. The deleted elements have become unnecessary since IPC 88 has already used them to successfully complete the processing and compression operations and since any other relevant elements have been stored in the compressed image file. In the preferred embodiment, the unnecessary data cell 76 elements deleted from data cell 76 in working memory 72 typically include IP parameters 826, image size 808, watermark data 824 and image-capture settings 828. In alternate embodiments, the deleted data cell 76 elements may further include image status flags 814, background processing stage 816, time/date stamp 818, delete request 820 and stop-processing request 822.

Next, IPC 88 deletes 938 the raw image data file from flash disk 64, including the copy of the data cell 76 which data cell manager 95 placed into the raw image data file during step 918. Data cell manager then passes 940 the generated data cell 76 pointer to RAM spooler 2 (90) by placing the data cell 76 pointer in the RAM spooler 2 (90) input queue 78(e) RAM spooler 2 (90) then copies 942 the compressed image data file to RAM disk 74 if IPC 88 was unable to store the compressed image data file to RAM disk 74 in 17 step 934 above.

Data cell manager then passes 944 the generated data cell 76 pointer to flash spooler 2 (92) by placing the data cell 76 pointer in the flash spooler 2 (92) input queue 78(f). Flash spooler 2 (92) then copies 946 the compressed image data file to flash disk 64 and deletes 948 the compressed image data file from flash disk 64.

FIGS. 9A and 9B illustrate the preferred operation of the present invention using a single captured image and corresponding data cell 76. The present invention, however, typically operates to capture, process and store a series of captured images. Using multi-tasking and task-priority techniques, the present invention may effectively handle multiple captured images at various processing stages within camera 110. Therefore, the process steps of FIGS. 9A and 9B may advantageously be repeated for each captured image in accordance with the present invention.

Figure 10:
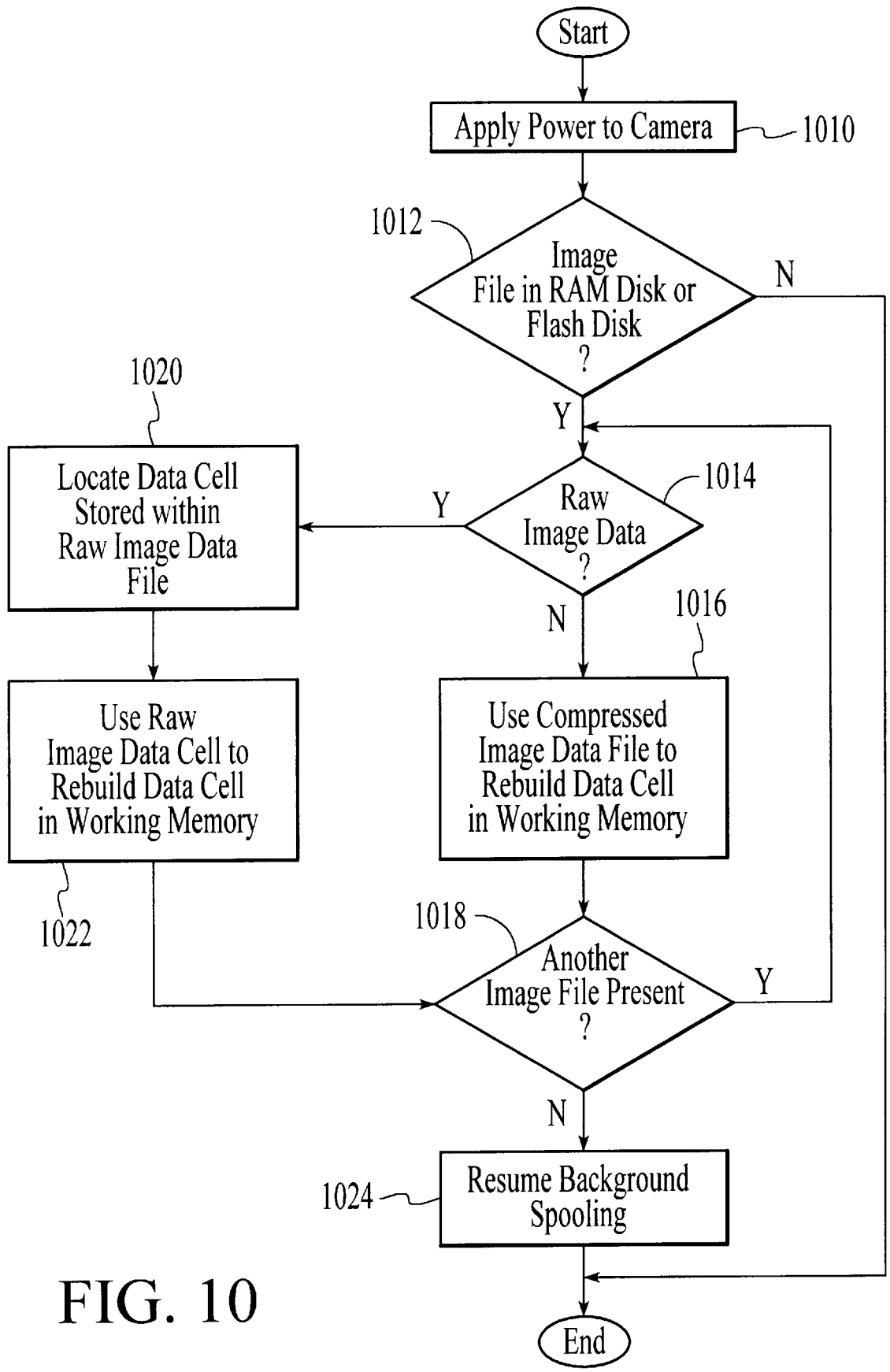
FIG. 10 is a flowchart showing preferred method steps for using the present invention to recover from a disruptive event within a digital camera device.

Referring now to FIG. 10, a flowchart showing preferred method steps for using the present invention to recover from a disruptive event within camera 10 is shown. Disruptive events may comprise a variety of occurrences which endanger captured image data within camera 10, including a power failure within camera 10 or removal of flash disk 64 while a captured image is being processed.

Following a particular disruptive event, a camera 10 user initially remedies the disrupting factor and then applies 1010 power to camera 10. Data cell manager 95 then determines 1012 whether an image data file was stored in RAM disk 74 or flash disk 64 prior to the intervening disruptive event. In the event of a power failure within camera 10, image data files on RAM disk 74 are protected through the use of backup batteries.

If no image data files were present in RAM disk 74 or flash disk 64 prior to the intervening disruptive event, then the FIG. 10 process ends. However, if image data files were present in RAM disk 74 or flash disk 64, then data cell manager 95 determines 1014 whether the image data files contained raw or compressed image data. If the image data file contained compressed image data, then data cell manager 95 accesses and uses 1016 that compressed image data file to rebuild the data cell 76 in working memory 72.

If, however, the image data file contained raw image data, then data cell manager 95 locates 1020 the copy of the data cell 76 stored within the raw image data file and then uses 1022 that raw image data cell 76 to rebuild the data cell 76 within working memory 72. After data cell manager 95 rebuilds the current data cell 76 within working memory 72, then data cell manager 95 determines 1018 whether another image file is present in RAM disk 74 or flash disk 64. If another image file is present, then the FIG. 10 process returns to step 1014 to rebuild the data cell 76 which corresponds to the additional image file. After data cell manager 95 rebuilds all data cells 76 within working memory 72, camera 110 may then resume 1024 normal background spooling processes 84 through 92 to process and store the captured image data.

The present invention has been described above with reference to certain preferred embodiments, however those skilled in the art will recognize that various modifications may be provided. Furthermore, while the present invention has been discussed above as applied to digital cameras, those skilled in the art will also recognize that the current apparatus and method may also be applied to various other devices. These and other variations upon the preferred embodiment are provided for by the present invention, which is limited only by the following claims.

What is claimed is:

1. A digital imaging system capable of correlating processing data and image data, said digital imaging system comprising:

a capturing device responsive to an image capture request for receiving image data for a first captured image and first processing data including settings of said capturing device at image capture time;

a manager device coupled to said capturing device for building a data cell containing said first processing data and for linking said data cell to said image data; and a processing device coupled to said capturing device for processing said image data using said first processing data within said data cell, wherein said capturing device is operable for receiving image data for a second captured image using processing data that is different than said first processing data while said processing of said image data for said first captured image is being performed using said first processing data.

2. The digital imaging system of claim 1 wherein said manager device is operable for deleting a selected portion of said processing data from said data cell after said processing device has finished processing said image data.

3. The digital imaging system of claim 2 wherein said processing device is operable for storing said image data into a memory device after said manager device has deleted said selected portion of said processing data from said data cell.

4. The digital imaging system of claim 1 wherein said manager device is operable for making a copy of said data cell and for appending said copy of said data cell to said image data.

5. The digital imaging system of claim 4 wherein said manager device is operable for rebuilding said data cell after a disruptive event using said copy of said data cell appended to said image data.

6. The digital imaging system of claim 1 wherein said processing of said image data includes compressing said image data.

7. A method for correlating processing data and image data in a digital imaging system, said method comprising the steps of:
   a) receiving image data for a first captured image and first processing data using a capturing device, wherein said first processing data includes settings of said capturing device at image capture time;
   b) building a data cell with a manager device, wherein said data cell contains said first processing data;
   c) linking said data cell to said image data;
   d) receiving image data for a second captured image and second processing data that is different from said first processing data; and
   e) processing said image data for said first captured image using said first processing data within said data cell can be while said capturing device is receiving said image data for said second captured image.

8. The method of claim 7 further comprising step f) of deleting a selected portion of said processing data from said data cell after said step e).

9. The method of claim 8 further comprising the step of storing said image data into a memory device after said step f).

10. The method of claim 7 further comprising the steps of:
   making a copy of said data cell; and
   appending said copy of said data cell to said image data.

11. The method of claim 10 further comprising the step of rebuilding said data cell after a disruptive event using said copy of said data cell appended to said image data.

12. The method of claim 7 wherein said step e) comprises the step of compressing said image data.

13. A computer-readable medium comprising program instructions for correlating processing data and image data in a digital imaging system, wherein said program instructions, when executed by a computer system coupled to said digital imaging system, cause said digital imaging system to implement the steps of:
   a) receiving image data for a first captured image and first processing data using a capturing device, wherein said first processing data includes settings of said capturing device at image capture time;
   b) building a data cell with a manager device, wherein said data cell contains said first processing data;
   c) linking said data cell to said image data;
   d) receiving image data for a second captured image and second processing data that is different from said first processing data; and
   e) processing said image data for said first captured image using said first processing data within said data cell while said capturing device is receiving said image data for said second captured image.

14. The computer-readable medium of claim 13 wherein said program instructions, when executed, cause said digital imaging system to implement step f) of deleting a selected portion of said processing data from said data cell after said step e).

15. The computer-readable medium of claim 14 wherein said program instructions, when executed, cause said digital imaging system to implement the step of storing said image data into a memory device after said step f).

16. The computer-readable medium of claim 13 wherein said program instructions, when executed, cause said digital imaging system to implement the steps of:
   making a copy of said data cell; and
   appending said copy of said data cell to said image data.

17. The computer-readable medium of claim 16 wherein said program instructions, when executed, cause said digital imaging system to implement the step of rebuilding said data cell after a disruptive event using said copy of said data cell appended to said image data.

18. The computer-readable medium of claim 13 wherein said step e) comprises the step of compressing said image data.

* * * * *

UNITED STATES PATENT AND TRADEMARK OFFICE
CERTIFICATE OF CORRECTION

PATENT NO.        : 6,177,956 C1                                    Page 1 of 1
APPLICATION NO.   : 90/010674
DATED             : July 5, 2011
INVENTOR(S)       : Eric C. Anderson, et al.

It is certified that error appears in the above-identified patent and that said Letters Patent is hereby corrected as shown below:

Column 1, line 57, change "first status" to --the first status--;

Column 2, lines 64-65, change "at least" to --the at least--; and

Column 4, line 7, change "cells" to --cell--.

Signed and Sealed this
Twenty-seventh Day of September, 2011

David J. Kappos
*Director of the United States Patent and Trademark Office*

US 6,177,956 C1

(12) EX PARTE REEXAMINATION CERTIFICATE (8379th)

United States Patent
Anderson et al.

(10) Number: US 6,177,956 C1
(45) Certificate Issued: Jul. 5, 2011

(54) SYSTEM AND METHOD FOR CORRELATING PROCESSING DATA AND IMAGE DATA WITHIN A DIGITAL CAMERA DEVICE

(75) Inventors: Eric C. Anderson, San Jose, CA (US); Mike M. Masukawa, Los Gatos, CA (US)

(73) Assignee: Flashpoint Technology, Inc., San Jose, CA (US)

Reexamination Request:
No. 90/010,674, Oct. 2, 2009
No. 90/009,694, Feb. 22, 2010

Reexamination Certificate for:
Patent No.: 6,177,956
Issued: Jan. 23, 2001
Appl. No.: 08/735,705
Filed: Oct. 23, 1996

(51) Int. Cl.
*H04N 5/76* (2006.01)

(52) U.S. Cl. .................. 348/207.99; 348/231.5
(58) Field of Classification Search ............ 348/231
See application file for complete search history.

(56) References Cited

U.S. PATENT DOCUMENTS

| | | | |
|---|---|---|---|
| 2,289,555 A | 7/1942 | Simons | |
| 3,814,227 A | 6/1974 | Hurd, III et al. | |
| 3,971,065 A | 7/1976 | Bayer | |
| 3,991,625 A | 11/1976 | Preston | |
| 4,011,571 A | 3/1977 | Okuzawa | |
| 4,017,680 A | 4/1977 | Anderson et al. | |
| 4,125,111 A | 11/1978 | Hudspeth et al. | |
| 4,158,208 A | 6/1979 | Dischert | |
| 4,172,327 A | 10/1979 | Kuehn et al. | |
| 4,195,317 A | 3/1980 | Stratton | |
| 4,234,890 A | 11/1980 | Astle et al. | |
| 4,325,080 A | 4/1982 | Satoh | |
| 4,337,479 A | 6/1982 | Tomimoto et al. | |
| 4,347,618 A | 8/1982 | Kavouras et al. | |
| 4,364,650 A | 12/1982 | Terashita et al. | |
| 4,403,303 A | 9/1983 | Howes et al. | |
| 4,416,282 A | 11/1983 | Saulson et al. | |
| 4,456,931 A | 6/1984 | Toyoda et al. | |
| 4,466,230 A | 8/1984 | Osselaere et al. | |
| 4,470,067 A | 9/1984 | Mino | |
| 4,471,382 A | 9/1984 | Toyoda et al. | |
| 4,519,692 A | 5/1985 | Michalik | |
| 4,531,161 A | 7/1985 | Murakoshi | |
| 4,540,276 A | 9/1985 | Ost | |
| 4,574,319 A | 3/1986 | Konishi | |
| 4,601,055 A | 7/1986 | Kent | |
| 4,623,930 A | 11/1986 | Oshima et al. | |
| 4,691,253 A | 9/1987 | Silver | |
| 4,723,169 A | 2/1988 | Kaji | |

(Continued)

FOREIGN PATENT DOCUMENTS

| | | | |
|---|---|---|---|
| EP | 0122094 A2 | 10/1984 |
| EP | 0421769 A2 | 4/1991 |
| EP | 0422447 A2 | 4/1991 |

(Continued)

OTHER PUBLICATIONS

Foley et al., *Computer Graphics—Principles and Practice, Second Edition in C,* Addison–Wesley Publishing Company, New York, 1996, pp. 132–137, 506–509, 755–759.
Buderi, Robert, "Photos That Talk," *Upside Today,* Jan. 27, 1999, <http://www.uspide.com/texis/mvm/story?id=36b0cb860>.
*Sony Digital Still Camera DSC–F1 Operating Instructions,* pp. 1–6, 16–17, 22–25, and 57–58, published 1996.

(Continued)

*Primary Examiner*—Andrew L Nalven

(57) ABSTRACT

A system and method for correlating processing data and image data within a digital camera device comprises a capture device for gathering image data, a data cell manager for building a data cell containing processing data and for linking the data cell to the image data, and a processor device for processing and compressing the image data by using the processing data stored within the data cell.

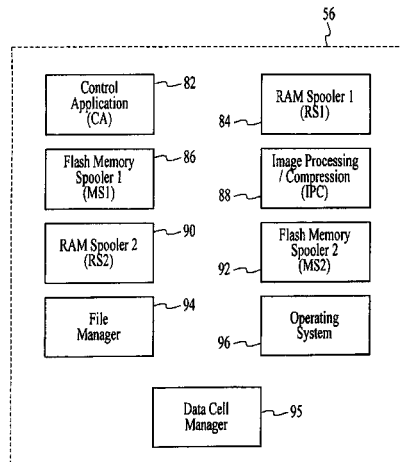

U.S. PATENT DOCUMENTS

| | | |
|---|---|---|
| 4,736,224 A | 4/1988 | Watanabe et al. |
| 4,739,409 A | 4/1988 | Baumeister |
| 4,772,941 A | 9/1988 | Noble |
| 4,774,600 A | 9/1988 | Baumeister |
| 4,823,283 A | 4/1989 | Diehm et al. |
| 4,827,347 A | 5/1989 | Bell |
| 4,855,831 A | 8/1989 | Miyamoto et al. |
| 4,866,292 A | 9/1989 | Takemoto et al. |
| 4,882,683 A | 11/1989 | Rupp et al. |
| 4,887,161 A | 12/1989 | Watanabe et al. |
| 4,888,812 A | 12/1989 | Dinan et al. |
| 4,893,198 A | 1/1990 | Little |
| 4,907,089 A | 3/1990 | Yamaguchi et al. |
| 4,916,435 A | 4/1990 | Fuller |
| 4,935,809 A | 6/1990 | Hayashi et al. |
| 4,937,676 A | 6/1990 | Finelli et al. |
| 4,937,685 A | 6/1990 | Barker et al. |
| 4,965,675 A | 10/1990 | Hori et al. |
| 4,972,495 A | 11/1990 | Blike et al. |
| 4,982,291 A | 1/1991 | Kurahashi et al. |
| 4,992,887 A | 2/1991 | Aragaki |
| 5,001,697 A | 3/1991 | Torres |
| 5,007,027 A | 4/1991 | Shimoi |
| 5,016,107 A | 5/1991 | Sasson et al. |
| 5,018,017 A | 5/1991 | Sasaki et al. |
| 5,020,012 A | 5/1991 | Stockberger et al. |
| 5,021,989 A | 6/1991 | Fujisawa et al. |
| 5,027,150 A | 6/1991 | Inoue et al. |
| 5,031,329 A | 7/1991 | Smallidge |
| 5,032,918 A | 7/1991 | Ota et al. |
| 5,032,926 A | 7/1991 | Imai et al. |
| 5,034,804 A | 7/1991 | Sasaki et al. |
| 5,040,068 A | 8/1991 | Parulski et al. |
| 5,040,070 A | 8/1991 | Higashitsutsumi et al. |
| 5,043,801 A | 8/1991 | Watanabe |
| 5,043,816 A | 8/1991 | Nakano et al. |
| 5,057,924 A | 10/1991 | Yamada et al. |
| 5,063,600 A | 11/1991 | Norwood |
| 5,065,246 A | 11/1991 | Takemoto et al. |
| 5,067,029 A | 11/1991 | Takahashi |
| 5,070,406 A | 12/1991 | Kinoshita |
| 5,073,823 A | 12/1991 | Yamada et al. |
| 5,077,582 A | 12/1991 | Kravette et al. |
| 5,083,383 A | 1/1992 | Heger |
| 5,093,716 A | 3/1992 | Kondo et al. |
| 5,099,262 A | 3/1992 | Tanaka et al. |
| 5,101,225 A | 3/1992 | Wash et al. |
| 5,101,364 A | 3/1992 | Davenport et al. |
| 5,106,107 A | 4/1992 | Justus et al. |
| 5,122,827 A | 6/1992 | Saegusa et al. |
| 5,123,088 A | 6/1992 | Kasahara et al. |
| 5,124,537 A | 6/1992 | Chandler et al. |
| 5,124,814 A | 6/1992 | Takahashi et al. |
| 5,130,812 A | 7/1992 | Yamaoka |
| 5,138,459 A | 8/1992 | Roberts et al. |
| 5,138,460 A | 8/1992 | Egawa |
| 5,140,358 A | 8/1992 | Tokunaga et al. |
| 5,142,319 A | 8/1992 | Wakabayashi et al. |
| 5,144,358 A | 9/1992 | Tsuru et al. |
| 5,144,445 A | 9/1992 | Higashitsutsumi |
| 5,146,353 A | 9/1992 | Isoguchi et al. |
| 5,153,729 A | 10/1992 | Saito |
| 5,153,730 A | 10/1992 | Nagasaki et al. |
| 5,159,364 A | 10/1992 | Yanagisawa et al. |
| 5,161,012 A | 11/1992 | Choi |
| 5,161,025 A | 11/1992 | Nakao |
| 5,161,535 A | 11/1992 | Short et al. |
| 5,164,751 A | 11/1992 | Weyer |
| 5,164,831 A | 11/1992 | Kuchta et al. |
| 5,179,653 A | 1/1993 | Fuller |
| 5,187,776 A | 2/1993 | Yanker |
| 5,189,404 A | 2/1993 | Masimo et al. |
| 5,189,490 A | 2/1993 | Shetty et al. |
| 5,193,538 A | 3/1993 | Ekwall |
| 5,194,944 A | 3/1993 | Uchiyama et al. |
| 5,198,851 A | 3/1993 | Ogawa |
| 5,199,101 A | 3/1993 | Cusick et al. |
| 5,200,818 A | 4/1993 | Neta et al. |
| 5,218,459 A | 6/1993 | Parulski et al. |
| 5,218,647 A | 6/1993 | Blonstein et al. |
| 5,220,420 A | 6/1993 | Hoarty et al. |
| 5,220,614 A | 6/1993 | Crain |
| 5,223,935 A | 6/1993 | Tsuji et al. |
| 5,224,207 A | 6/1993 | Filion et al. |
| 5,229,856 A | 7/1993 | Koshiishi |
| 5,231,511 A | 7/1993 | Kodama et al. |
| 5,231,651 A | 7/1993 | Ozaki et al. |
| 5,237,648 A | 8/1993 | Mills et al. |
| 5,237,650 A | 8/1993 | Priem et al. |
| 5,239,419 A | 8/1993 | Kim |
| 5,247,321 A | 9/1993 | Kazami |
| 5,247,327 A | 9/1993 | Suzuka et al. |
| 5,253,071 A | 10/1993 | MacKay |
| 5,260,795 A | 11/1993 | Sakai et al. |
| 5,262,863 A | 11/1993 | Okada |
| 5,262,867 A | 11/1993 | Kojima |
| 5,262,868 A | 11/1993 | Kaneko et al. |
| 5,262,869 A | 11/1993 | Hong |
| 5,270,821 A | 12/1993 | Samuels |
| 5,270,831 A | 12/1993 | Parulski et al. |
| 5,274,458 A | 12/1993 | Kondo et al. |
| 5,276,563 A | 1/1994 | Ogawa |
| 5,283,560 A | 2/1994 | Bartlett |
| 5,283,792 A | 2/1994 | Davies, Jr. et al. |
| 5,287,192 A | 2/1994 | Iizuka |
| 5,301,026 A | 4/1994 | Lee |
| 5,302,997 A | 4/1994 | Cocca |
| 5,307,318 A | 4/1994 | Nemoto |
| 5,309,243 A | 5/1994 | Tsai |
| 5,311,240 A | 5/1994 | Wheeler |
| 5,331,366 A | 7/1994 | Tokunaga et al. |
| 5,335,072 A | 8/1994 | Tanaka et al. |
| 5,341,466 A | 8/1994 | Perlin et al. |
| 5,343,246 A | 8/1994 | Arai et al. |
| 5,343,386 A | 8/1994 | Barber |
| 5,343,509 A | 8/1994 | Dounies |
| 5,345,552 A | 9/1994 | Brown |
| 5,359,427 A | 10/1994 | Sato |
| 5,359,728 A | 10/1994 | Rusnack et al. |
| 5,367,318 A | 11/1994 | Beaudin et al. |
| 5,373,153 A | 12/1994 | Cumberledge et al. |
| 5,375,160 A | 12/1994 | Guidon et al. |
| 5,386,111 A | 1/1995 | Zimmerman |
| 5,386,177 A | 1/1995 | Uhm |
| 5,386,552 A | 1/1995 | Garney |
| 5,390,026 A | 2/1995 | Lim |
| 5,390,314 A | 2/1995 | Swanson |
| 5,392,462 A | 2/1995 | Komaki |
| 5,396,343 A | 3/1995 | Hanselman |
| 5,402,170 A | 3/1995 | Parulski et al. |
| 5,402,171 A | 3/1995 | Tagami et al. |
| 5,404,316 A | 4/1995 | Klingler et al. |
| 5,404,505 A | 4/1995 | Levinson |
| 5,408,265 A | 4/1995 | Sasaki |
| 5,414,811 A | 5/1995 | Parulski et al. |
| 5,416,556 A | 5/1995 | Suzuki et al. |
| 5,420,635 A | 5/1995 | Konishi et al. |
| 5,425,137 A | 6/1995 | Mohan et al. |
| 5,428,733 A | 6/1995 | Carr |
| 5,432,871 A | 7/1995 | Novik |
| 5,432,900 A | 7/1995 | Rhodes et al. |

| Patent | Date | Inventor |
|---|---|---|
| 5,434,618 A | 7/1995 | Hayashi et al. |
| 5,434,958 A | 7/1995 | Surma et al. |
| 5,434,969 A | 7/1995 | Heilveil et al. |
| 5,436,657 A | 7/1995 | Fukuoka |
| 5,436,659 A | 7/1995 | Vincent |
| 5,440,401 A | 8/1995 | Parulski et al. |
| 5,442,465 A | 8/1995 | Compton |
| 5,444,482 A | 8/1995 | Misawa et al. |
| 5,448,372 A | 9/1995 | Axman et al. |
| 5,452,145 A | 9/1995 | Wakui et al. |
| 5,459,830 A | 10/1995 | Ohba et al. |
| 5,461,429 A | 10/1995 | Konishi et al. |
| 5,463,728 A | 10/1995 | Blahut et al. |
| 5,463,729 A | 10/1995 | Kitaguchi et al. |
| 5,465,133 A | 11/1995 | Aoki et al. |
| 5,467,288 A | 11/1995 | Fasciano et al. |
| 5,473,370 A | 12/1995 | Moronaga et al. |
| 5,473,371 A | 12/1995 | Choi |
| 5,475,428 A | 12/1995 | Hintz et al. |
| 5,475,441 A | 12/1995 | Parulski et al. |
| 5,475,812 A | 12/1995 | Corona et al. |
| 5,477,264 A | 12/1995 | Sarbadhikari et al. |
| 5,481,330 A | 1/1996 | Yamasaki |
| 5,481,667 A | 1/1996 | Bieniek et al. |
| 5,486,853 A | 1/1996 | Baxter et al. |
| 5,488,414 A | 1/1996 | Hirasawa et al. |
| 5,489,945 A | 2/1996 | Kannegundla et al. |
| 5,489,955 A | 2/1996 | Satoh et al. |
| 5,493,332 A | 2/1996 | Dalton et al. |
| 5,493,335 A | 2/1996 | Parulski et al. |
| 5,495,342 A | 2/1996 | Harigaya et al. |
| 5,495,559 A | 2/1996 | Makino |
| 5,496,106 A | 3/1996 | Anderson |
| 5,497,193 A | 3/1996 | Mitsuhashi et al. |
| 5,500,936 A | 3/1996 | Allen et al. |
| 5,502,486 A | 3/1996 | Ueda et al. |
| 5,510,830 A | 4/1996 | Ohia et al. |
| 5,512,941 A | 4/1996 | Takahashi et al. |
| 5,513,306 A | 4/1996 | Mills et al. |
| 5,513,342 A | 4/1996 | Leong et al. |
| 5,515,101 A | 5/1996 | Yoshida |
| 5,517,606 A | 5/1996 | Matheny et al. |
| 5,519,815 A | 5/1996 | Klassen |
| 5,521,639 A | 5/1996 | Tomura et al. |
| 5,521,663 A | 5/1996 | Norris, III |
| 5,521,717 A | 5/1996 | Maeda |
| 5,521,841 A | 5/1996 | Arman et al. |
| 5,523,786 A | 6/1996 | Parulski |
| 5,523,857 A | 6/1996 | Fukushima |
| 5,525,957 A | 6/1996 | Tanaka |
| 5,528,293 A | 6/1996 | Watanabe |
| 5,528,315 A | 6/1996 | Sugiyama |
| 5,530,235 A | 6/1996 | Stefik et al. |
| 5,532,740 A | 7/1996 | Wakui |
| 5,534,975 A | 7/1996 | Stefik et al. |
| 5,537,151 A | 7/1996 | Orr et al. |
| 5,537,530 A | 7/1996 | Edgar et al. |
| 5,539,528 A | 7/1996 | Tawa |
| 5,539,535 A | 7/1996 | Aizawa et al. |
| 5,539,658 A | 7/1996 | McCullough |
| 5,541,656 A | 7/1996 | Kare et al. |
| 5,548,371 A | 8/1996 | Kawahara et al. |
| 5,548,409 A | 8/1996 | Ohta et al. |
| 5,550,646 A | 8/1996 | Hassan et al. |
| 5,550,938 A | 8/1996 | Hayakawa et al. |
| 5,552,806 A | 9/1996 | Lenchik |
| 5,553,277 A | 9/1996 | Hirano et al. |
| 5,555,193 A | 9/1996 | Tsinberg et al. |
| 5,559,554 A | 9/1996 | Uekane et al. |
| 5,560,022 A | 9/1996 | Dunstan et al. |
| 5,563,655 A | 10/1996 | Lathrop |
| 5,568,167 A | 10/1996 | Galbi et al. |
| 5,568,192 A | 10/1996 | Hannah |
| 5,572,233 A | 11/1996 | Kakegawa |
| 5,574,933 A | 11/1996 | Horst |
| 5,576,757 A | 11/1996 | Roberts et al. |
| 5,576,759 A | 11/1996 | Kawamura et al. |
| 5,577,190 A | 11/1996 | Peters |
| 5,578,757 A | 11/1996 | Roth |
| 5,579,048 A | 11/1996 | Hirasawa |
| 5,579,450 A | 11/1996 | Hanyu et al. |
| 5,581,311 A | 12/1996 | Kuroiwa |
| 5,585,845 A | 12/1996 | Kawamura et al. |
| 5,587,740 A | 12/1996 | Brennan |
| 5,589,902 A | 12/1996 | Gruel et al. |
| 5,590,306 A | 12/1996 | Watanabe et al. |
| 5,592,301 A | 1/1997 | Shimada |
| 5,594,524 A | 1/1997 | Sasagaki et al. |
| 5,597,193 A | 1/1997 | Conner |
| 5,606,365 A | 2/1997 | Maurinus et al. |
| 5,608,491 A | 3/1997 | Sasagaki et al. |
| 5,610,653 A | 3/1997 | Abecassis |
| 5,619,738 A | 4/1997 | Petruchik et al. |
| 5,621,459 A | 4/1997 | Ueda et al. |
| 5,621,906 A | 4/1997 | O'Neill |
| 5,625,412 A | 4/1997 | Aciu et al. |
| 5,630,017 A | 5/1997 | Gasper et al. |
| 5,631,701 A | 5/1997 | Miyake |
| 5,631,871 A | 5/1997 | Park et al. |
| 5,633,573 A | 5/1997 | van Phuoc et al. |
| 5,633,678 A | 5/1997 | Parulski et al. |
| 5,633,976 A | 5/1997 | Ogino |
| 5,634,000 A | 5/1997 | Wicht |
| 5,635,983 A | 6/1997 | Ohmori |
| 5,635,984 A | 6/1997 | Lee |
| 5,637,871 A | 6/1997 | Piety et al. |
| 5,638,123 A | 6/1997 | Yamaguchi |
| 5,638,498 A | 6/1997 | Tyler et al. |
| 5,638,501 A | 6/1997 | Gough et al. |
| 5,640,193 A | 6/1997 | Wellner |
| 5,640,202 A | 6/1997 | Kondo et al. |
| 5,640,204 A | 6/1997 | Tsutsui |
| 5,640,627 A | 6/1997 | Nakano et al. |
| 5,644,694 A | 7/1997 | Appleton |
| 5,648,816 A | 7/1997 | Wakui |
| 5,649,032 A | 7/1997 | Burt et al. |
| 5,649,186 A | 7/1997 | Ferguson |
| 5,651,107 A | 7/1997 | Frank et al. |
| 5,659,547 A | 8/1997 | Scarr et al. |
| 5,659,729 A | 8/1997 | Nielsen |
| 5,664,087 A | 9/1997 | Tani et al. |
| 5,666,580 A | 9/1997 | Ito et al. |
| 5,668,639 A | 9/1997 | Martin |
| 5,671,378 A | 9/1997 | Acker et al. |
| 5,671,440 A | 9/1997 | Curry |
| 5,673,304 A | 9/1997 | Connor et al. |
| 5,674,003 A | 10/1997 | Andersen et al. |
| 5,675,358 A | 10/1997 | Bullock et al. |
| 5,675,752 A | 10/1997 | Scott et al. |
| 5,680,533 A | 10/1997 | Yamato et al. |
| 5,680,534 A | 10/1997 | Yamato et al. |
| 5,682,197 A | 10/1997 | Moghadam et al. |
| 5,682,207 A | 10/1997 | Takeda et al. |
| 5,682,326 A | 10/1997 | Klingler et al. |
| 5,682,441 A | 10/1997 | Ligtenberg et al. |
| 5,684,511 A | 11/1997 | Westerink et al. |
| 5,684,542 A | 11/1997 | Tsukagoshi |
| 5,687,408 A | 11/1997 | Park |
| 5,699,109 A | 12/1997 | Nishimura et al. |
| 5,703,644 A | 12/1997 | Mori et al. |
| 5,706,049 A | 1/1998 | Moghadam et al. |
| 5,706,097 A | 1/1998 | Schelling et al. |

| | | | | | |
|---|---|---|---|---|---|
| 5,706,457 A | 1/1998 | Dwyer et al. | 5,819,103 A | 10/1998 | Endoh et al. |
| 5,708,810 A | 1/1998 | Kern et al. | 5,821,997 A | 10/1998 | Kawamura et al. |
| 5,711,330 A | 1/1998 | Nelson | 5,822,492 A | 10/1998 | Wakui et al. |
| 5,719,967 A | 2/1998 | Sekine | 5,822,581 A | 10/1998 | Christeson |
| 5,719,978 A | 2/1998 | Kakii et al. | 5,828,406 A | 10/1998 | Parulski et al. |
| 5,719,987 A | 2/1998 | Kawamura et al. | 5,828,793 A | 10/1998 | Mann |
| 5,721,908 A | 2/1998 | Lagarde et al. | 5,831,590 A | 11/1998 | Ikedo |
| 5,721,909 A | 2/1998 | Oulid-Aissa et al. | 5,831,872 A | 11/1998 | Pan et al. |
| 5,724,070 A | 3/1998 | Denninghoff et al. | 5,835,761 A | 11/1998 | Ishii et al. |
| 5,724,475 A | 3/1998 | Kirsten | 5,835,772 A | 11/1998 | Thurlo |
| 5,724,579 A | 3/1998 | Suzuki | 5,838,325 A | 11/1998 | Deen et al. |
| 5,727,112 A | 3/1998 | Kellar et al. | 5,841,422 A | 11/1998 | Shyu |
| 5,727,159 A | 3/1998 | Kikinis | 5,841,471 A | 11/1998 | Endsley et al. |
| 5,729,289 A | 3/1998 | Etoh | 5,845,166 A | 12/1998 | Fellegara et al. |
| 5,734,427 A | 3/1998 | Hayashi | 5,847,706 A | 12/1998 | Kingsley |
| 5,734,436 A | 3/1998 | Abe et al. | 5,848,193 A | 12/1998 | Garcia |
| 5,734,915 A | 3/1998 | Roewer | 5,848,420 A | 12/1998 | Xu |
| 5,737,032 A | 4/1998 | Stenzel et al. | 5,850,483 A | 12/1998 | Takabatake et al. |
| 5,737,476 A | 4/1998 | Kim | 5,852,502 A | 12/1998 | Beckett |
| 5,737,491 A | 4/1998 | Allen et al. | 5,861,918 A | 1/1999 | Anderson et al. |
| 5,740,267 A | 4/1998 | Echerer et al. | 5,862,218 A | 1/1999 | Steinberg |
| 5,740,801 A | 4/1998 | Branson | 5,867,214 A | 2/1999 | Anderson et al. |
| 5,742,339 A | 4/1998 | Wakui | 5,870,756 A | 2/1999 | Nakata et al. |
| 5,742,475 A | 4/1998 | Riddiford | 5,873,007 A | 2/1999 | Ferrada Suarez |
| 5,742,504 A | 4/1998 | Meyer et al. | 5,874,959 A | 2/1999 | Rowe |
| 5,742,659 A | 4/1998 | Atac et al. | 5,877,746 A | 3/1999 | Parks et al. |
| 5,742,698 A | 4/1998 | Minami et al. | 5,881,205 A | 3/1999 | Andrew et al. |
| 5,748,326 A | 5/1998 | Thompson-Bell et al. | 5,883,610 A | 3/1999 | Jeon |
| 5,748,831 A | 5/1998 | Kubo | 5,892,511 A | 4/1999 | Gelsinger et al. |
| 5,751,350 A | 5/1998 | Tanaka | 5,892,847 A | 4/1999 | Johnson |
| 5,752,244 A | 5/1998 | Rose et al. | 5,896,131 A | 4/1999 | Alexander |
| 5,754,873 A | 5/1998 | Nolan | 5,896,203 A | 4/1999 | Shibata |
| 5,757,418 A | 5/1998 | Inagaki | 5,898,434 A | 4/1999 | Small et al. |
| 5,757,427 A | 5/1998 | Miyaguchi | 5,898,779 A | 4/1999 | Squilla et al. |
| 5,757,468 A | 5/1998 | Patton et al. | 5,898,833 A | 4/1999 | Kidder |
| 5,758,180 A | 5/1998 | Duffy et al. | 5,900,909 A | 5/1999 | Parulski et al. |
| 5,760,767 A | 6/1998 | Shore et al. | 5,901,303 A | 5/1999 | Chew |
| 5,761,655 A | 6/1998 | Hoffman | 5,903,309 A | 5/1999 | Anderson |
| 5,761,686 A | 6/1998 | Bloomberg | 5,903,786 A | 5/1999 | Goto |
| 5,764,276 A | 6/1998 | Martin et al. | 5,907,315 A | 5/1999 | Vlahos et al. |
| 5,764,291 A | 6/1998 | Fullam | 5,910,805 A | 6/1999 | Hickey et al. |
| 5,767,897 A | 6/1998 | Howell | 5,917,488 A | 6/1999 | Anderson et al. |
| 5,767,904 A | 6/1998 | Miyake | 5,920,726 A | 7/1999 | Anderson |
| 5,769,713 A | 6/1998 | Katayama | 5,926,208 A | 7/1999 | Noonen et al. |
| 5,771,034 A | 6/1998 | Gibson | 5,929,904 A | 7/1999 | Uchida |
| 5,773,810 A | 6/1998 | Hussey et al. | 5,933,137 A | 8/1999 | Anderson |
| 5,774,131 A | 6/1998 | Kim | 5,937,106 A | 8/1999 | Murayama |
| 5,781,175 A | 7/1998 | Hara | 5,938,766 A | 8/1999 | Anderson et al. |
| 5,781,650 A | 7/1998 | Lobo et al. | 5,940,080 A | 8/1999 | Ruehle et al. |
| 5,781,798 A | 7/1998 | Beatty et al. | 5,940,121 A | 8/1999 | Mcintyre et al. |
| 5,784,177 A | 7/1998 | Sanchez et al. | 5,943,050 A | 8/1999 | Bullock et al. |
| 5,784,525 A | 7/1998 | Bell | 5,943,093 A | 8/1999 | Anderson et al. |
| 5,784,629 A | 7/1998 | Anderson et al. | 5,949,408 A | 9/1999 | Kang et al. |
| 5,786,851 A | 7/1998 | Kondo et al. | 5,949,432 A | 9/1999 | Gough et al. |
| D396,853 S | 8/1998 | Cooper et al. | 5,949,474 A | 9/1999 | Gerszberg et al. |
| 5,790,094 A | 8/1998 | Tanigawa et al. | 5,949,496 A | 9/1999 | Kim |
| 5,790,800 A | 8/1998 | Gauvin et al. | 5,949,950 A | 9/1999 | Kubo |
| 5,796,428 A | 8/1998 | Matsumoto et al. | 5,956,084 A | 9/1999 | Moronaga et al. |
| 5,796,875 A | 8/1998 | Read | 5,963,670 A | 10/1999 | Lipson et al. |
| 5,797,051 A | 8/1998 | McIntyre et al. | 5,966,122 A | 10/1999 | Itoh |
| 5,801,685 A | 9/1998 | Miller et al. | 5,969,718 A | 10/1999 | Mills et al. |
| 5,801,770 A | 9/1998 | Paff et al. | 5,969,761 A | 10/1999 | Takahashi et al. |
| 5,801,773 A | 9/1998 | Ikeda | 5,973,691 A | 10/1999 | Servan-Schreiber |
| 5,805,153 A | 9/1998 | Nielsen | 5,973,694 A | 10/1999 | Steele et al. |
| 5,805,163 A | 9/1998 | Bagnas | 5,973,734 A | 10/1999 | Anderson |
| 5,805,829 A | 9/1998 | Cohen et al. | 5,974,386 A | 10/1999 | Ejima et al. |
| 5,806,005 A | 9/1998 | Hull et al. | 5,977,975 A | 11/1999 | Mugura et al. |
| 5,806,072 A | 9/1998 | Kuba et al. | 5,977,976 A | 11/1999 | Maeda |
| 5,815,160 A | 9/1998 | Kikuchi et al. | 5,977,985 A | 11/1999 | Ishii et al. |
| 5,815,201 A | 9/1998 | Hashimoto et al. | 5,978,016 A | 11/1999 | Lourette et al. |
| 5,818,977 A | 10/1998 | Tansley | 5,978,020 A | 11/1999 | Watanabe et al. |

| | | | | | | |
|---|---|---|---|---|---|---|
| 5,978,607 | A | 11/1999 | Teremy et al. | 6,177,956 B1 | 1/2001 | Anderson et al. |
| 5,982,350 | A | 11/1999 | Hekmatpour et al. | 6,177,957 B1 | 1/2001 | Anderson |
| 5,982,429 | A | 11/1999 | Kamamoto et al. | 6,188,431 B1 | 2/2001 | Oie |
| 5,983,297 | A | 11/1999 | Noble et al. | 6,188,432 B1 | 2/2001 | Ejima |
| 5,986,701 | A | 11/1999 | Anderson et al. | 6,188,782 B1 | 2/2001 | Le Beux |
| 5,987,223 | A | 11/1999 | Narukawa et al. | 6,204,877 B1 | 3/2001 | Kiyokawa |
| 5,991,465 | A | 11/1999 | Anderson et al. | 6,205,485 B1 | 3/2001 | Kikinis |
| 5,991,515 | A | 11/1999 | Fall et al. | 6,209,048 B1 | 3/2001 | Wolff |
| 5,993,137 | A | 11/1999 | Harr | 6,211,870 B1 | 4/2001 | Foster |
| 5,999,173 | A | 12/1999 | Ubillos | 6,215,523 B1 | 4/2001 | Anderson |
| 5,999,191 | A | 12/1999 | Frank et al. | 6,222,538 B1 | 4/2001 | Anderson |
| 5,999,207 | A | 12/1999 | Rodriguez et al. | 6,223,190 B1 | 4/2001 | Aihara et al. |
| 5,999,740 | A | 12/1999 | Rowley | 6,226,449 B1 | 5/2001 | Inoue et al. |
| 6,003,093 | A | 12/1999 | Kester | 6,229,566 B1 | 5/2001 | Matsumoto et al. |
| 6,005,613 | A | 12/1999 | Endsley et al. | 6,230,307 B1 | 5/2001 | Davis et al. |
| 6,005,618 | A | 12/1999 | Fukui et al. | 6,233,015 B1 | 5/2001 | Miller et al. |
| 6,006,039 | A | 12/1999 | Steinberg et al. | 6,237,010 B1 | 5/2001 | Hui et al. |
| 6,009,336 | A | 12/1999 | Harris et al. | 6,239,794 B1 | 5/2001 | Yuen et al. |
| 6,011,585 | A | 1/2000 | Anderson | 6,239,837 B1 | 5/2001 | Yamada et al. |
| 6,011,926 | A | 1/2000 | Cockell | 6,246,430 B1 | 6/2001 | Peters et al. |
| 6,012,088 | A | 1/2000 | Li et al. | 6,249,316 B1 | 6/2001 | Anderson |
| 6,015,093 | A | 1/2000 | Barrett et al. | 6,256,063 B1 | 7/2001 | Saito et al. |
| 6,020,920 | A | 2/2000 | Anderson | 6,262,769 B1 | 7/2001 | Anderson et al. |
| 6,020,982 | A | 2/2000 | Yamauchi et al. | 6,275,260 B1 | 8/2001 | Anderson |
| 6,022,315 | A | 2/2000 | Iliff | 6,278,447 B1 | 8/2001 | Anderson |
| 6,023,241 | A | 2/2000 | Clapper | 6,285,398 B1 | 9/2001 | Shinsky et al. |
| 6,023,697 | A | 2/2000 | Bates et al. | 6,292,218 B1 | 9/2001 | Parulski et al. |
| 6,025,827 | A | 2/2000 | Bullock et al. | RE37,431 E | 10/2001 | Lanier et al. |
| 6,028,603 | A | 2/2000 | Wang et al. | 6,300,950 B1 | 10/2001 | Clark et al. |
| 6,028,611 | A | 2/2000 | Anderson et al. | 6,304,851 B1 | 10/2001 | Kmack et al. |
| 6,031,964 | A | 2/2000 | Anderson | 6,307,544 B1 | 10/2001 | Harding |
| 6,035,323 | A | 3/2000 | Narayen et al. | 6,310,647 B1 | 10/2001 | Parulski et al. |
| 6,035,359 | A | 3/2000 | Enoki | 6,310,648 B1 | 10/2001 | Miller et al. |
| 6,037,972 | A | 3/2000 | Horiuchi et al. | 6,317,141 B1 | 11/2001 | Pavley et al. |
| 6,038,545 | A | 3/2000 | Mandeberg et al. | 6,334,025 B1 | 12/2001 | Yamagami |
| 6,052,555 | A | 4/2000 | Ferguson | 6,353,848 B1 | 3/2002 | Morris |
| 6,052,692 | A | 4/2000 | Anderson et al. | 6,356,281 B1 | 3/2002 | Isenman |
| 6,058,428 | A | 5/2000 | Wang et al. | 6,356,357 B1 | 3/2002 | Anderson et al. |
| 6,072,479 | A | 6/2000 | Ogawa | 6,380,972 B1 | 4/2002 | Suga et al. |
| 6,072,480 | A | 6/2000 | Gorbet et al. | 6,400,375 B1 | 6/2002 | Okudaira |
| 6,072,489 | A | 6/2000 | Gough et al. | 6,400,471 B1 | 6/2002 | Kuo et al. |
| 6,075,905 | A | 6/2000 | Herman et al. | 6,426,771 B1 | 7/2002 | Kosugi |
| 6,078,005 | A | 6/2000 | Kurakake et al. | 6,437,829 B1 | 8/2002 | Webb et al. |
| 6,078,756 | A | 6/2000 | Squilla et al. | 6,441,854 B2 | 8/2002 | Fellegara et al. |
| 6,082,827 | A | 7/2000 | McFall | 6,441,927 B1 | 8/2002 | Dow et al. |
| 6,084,990 | A | 7/2000 | Suzuki et al. | 6,445,412 B1 | 9/2002 | Shiohara |
| 6,091,846 | A | 7/2000 | Lin et al. | 6,473,123 B1 | 10/2002 | Anderson |
| 6,091,956 | A | 7/2000 | Hollenberg | 6,483,602 B1 | 11/2002 | Haneda |
| 6,094,221 | A | 7/2000 | Andersion | 6,486,914 B1 | 11/2002 | Anderson |
| 6,097,389 | A | 8/2000 | Morris et al. | 6,493,028 B1 | 12/2002 | Anderson et al. |
| 6,097,430 | A | 8/2000 | Komiya et al. | 6,504,575 B1 | 1/2003 | Ramirez et al. |
| 6,097,431 | A | 8/2000 | Anderson et al. | 6,507,362 B1 | 1/2003 | Akerib |
| 6,111,604 | A | 8/2000 | Hashimoto et al. | 6,512,548 B1 | 1/2003 | Anderson |
| 6,118,480 | A | 9/2000 | Anderson et al. | 6,515,704 B1 | 2/2003 | Sato |
| 6,122,003 | A | 9/2000 | Anderson | 6,532,039 B2 | 3/2003 | Anderson |
| 6,122,005 | A | 9/2000 | Sasaki et al. | 6,536,357 B1 | 3/2003 | Hiestand |
| 6,122,409 | A | 9/2000 | Boggs et al. | 6,538,698 B1 | 3/2003 | Anderson |
| 6,128,013 | A | 10/2000 | Prabhu et al. | 6,563,535 B1 | 5/2003 | Anderson |
| 6,128,413 | A | 10/2000 | Benamara | 6,563,542 B1 | 5/2003 | Hatakenaka et al. |
| 6,137,468 | A | 10/2000 | Martinez et al. | 6,567,122 B1 | 5/2003 | Anderson et al. |
| 6,137,534 | A | 10/2000 | Anderson | 6,571,271 B1 | 5/2003 | Savitzky et al. |
| 6,141,044 | A | 10/2000 | Anderson et al. | 6,682,207 B2 | 1/2004 | Weber et al. |
| 6,144,362 | A | 11/2000 | Kawai | 6,683,649 B1 | 1/2004 | Anderson |
| 6,147,703 | A | 11/2000 | Miller et al. | 6,738,075 B1 | 5/2004 | Torres et al. |
| 6,147,709 | A | 11/2000 | Martin et al. | 6,747,692 B2 | 6/2004 | Patel et al. |
| 6,157,394 | A | 12/2000 | Anderson et al. | 6,765,612 B1 | 7/2004 | Anderson et al. |
| 6,161,131 | A | 12/2000 | Garfinkle | 6,779,153 B1 | 8/2004 | Kagle |
| 6,167,469 | A | 12/2000 | Safai et al. | 6,803,945 B1 | 10/2004 | Needham |
| 6,169,575 | B1 | 1/2001 | Anderson et al. | 6,806,906 B1 | 10/2004 | Soga et al. |
| 6,169,725 | B1 | 1/2001 | Gibbs et al. | 6,897,891 B2 | 5/2005 | Itsukaichi |
| 6,175,663 | B1 | 1/2001 | Huang | 6,965,400 B1 | 11/2005 | Haba et al. |

| | | | |
|---|---|---|---|
| 7,050,143 B1 | 5/2006 | Silverbrook et al. | |
| 7,215,371 B2 | 5/2007 | Fellegara et al. | |
| 7,337,403 B2 | 2/2008 | Pavley et al. | |
| 2001/0010543 A1 | 8/2001 | Ward et al. | |
| 2001/0012062 A1 | 8/2001 | Anderson | |
| 2001/0014910 A1 | 8/2001 | Bobo | |
| 2001/0014968 A1 | 8/2001 | Mohammed | |
| 2001/0049758 A1 | 12/2001 | Shigetomi et al. | |
| 2001/0050711 A1 | 12/2001 | Karube et al. | |
| 2002/0105582 A1 | 8/2002 | Ikeda | |
| 2002/0109782 A1 | 8/2002 | Ejima | |
| 2003/0169350 A1 | 9/2003 | Wiezel | |
| 2006/0174326 A1 | 8/2006 | Ginter et al. | |
| 2006/0200260 A1 | 9/2006 | Hoffberg | |
| 2007/0061594 A1 | 3/2007 | Ginter et al. | |

FOREIGN PATENT DOCUMENTS

| | | | |
|---|---|---|---|
| EP | 0463856 A2 | 1/1992 | |
| EP | 0519379 A2 | 6/1992 | |
| EP | 0528084 A1 | 2/1993 | |
| EP | 0555048 A2 | 8/1993 | |
| EP | 0568468 A2 | 11/1993 | |
| EP | 0617542 A2 | 9/1994 | |
| EP | 0650125 A1 | 4/1995 | |
| EP | 0661658 A2 | 7/1995 | |
| EP | 0664475 A1 | 7/1995 | |
| EP | 0664526 A2 | 7/1995 | |
| EP | 0664527 A1 | 7/1995 | |
| EP | 0729271 A2 | 8/1996 | |
| EP | 0449106 B1 | 12/1996 | |
| EP | 0817476 A2 | 1/1998 | |
| EP | 0821522 A2 | 1/1998 | |
| EP | 0835011 A1 | 4/1998 | |
| EP | 0860735 A2 | 8/1998 | |
| EP | 0860982 A2 | 8/1998 | |
| EP | 0890919 A1 | 1/1999 | |
| GB | 2245749 A | 1/1992 | |
| GB | 2289555 A | 11/1995 | |
| JP | 55-142470 A | 11/1980 | |
| JP | 55-142471 A | 11/1980 | |
| JP | 62-271178 A | 11/1987 | |
| JP | 1-132173 A | 5/1988 | |
| JP | 1-238382 A | 9/1989 | |
| JP | 1-319870 A | 12/1989 | |
| JP | 2-42489 A | 2/1990 | |
| JP | 2-162420 A | 6/1990 | |
| JP | 2-257262 A | 10/1990 | |
| JP | 2-280484 A | 11/1990 | |
| JP | 3-117181 A | 5/1991 | |
| JP | 3-231574 A | 10/1991 | |
| JP | 3-246766 A | 11/1991 | |
| JP | 3-506111 A | 12/1991 | |
| JP | 4-115788 A | 4/1992 | |
| JP | 4-120889 A | 4/1992 | |
| JP | 4-230517 A | 8/1992 | |
| JP | 4-302886 A | 10/1992 | |
| JP | 4-506144 A | 10/1992 | |
| JP | 4-372070 A | 12/1992 | |
| JP | 5-14847 A | 1/1993 | |
| JP | 5-91452 A | 4/1993 | |
| JP | 5-108785 A | 4/1993 | |
| JP | 5-115027 A | 5/1993 | |
| JP | 5-131779 A | 5/1993 | |
| JP | 5-150308 A | 6/1993 | |
| JP | 5-207343 A | 8/1993 | |
| JP | 5-260351 A | 10/1993 | |
| JP | 5-289838 A | 11/1993 | |
| JP | 5-290143 A | 11/1993 | |
| JP | 5-308617 A | 11/1993 | |
| JP | 5-314093 A | 11/1993 | |
| JP | 6-57612 A | 3/1994 | |
| JP | 6-60078 A | 3/1994 | |
| JP | 6-78260 A | 3/1994 | |
| JP | 6-103352 A | 4/1994 | |
| JP | 6-105266 A | 4/1994 | |
| JP | 6-178261 A | 6/1994 | |
| JP | 6-197299 A | 7/1994 | |
| JP | 6-265794 A | 9/1994 | |
| JP | 6-290103 A | 10/1994 | |
| JP | 6-348467 A | 12/1994 | |
| JP | 6-350949 A | 12/1994 | |
| JP | 7-6028 A | 1/1995 | |
| JP | 7-160842 A | 6/1995 | |
| JP | 7-168852 A | 7/1995 | |
| JP | 7-184160 A | 7/1995 | |
| JP | 7-221911 A | 8/1995 | |
| JP | 7-245723 A | 9/1995 | |
| JP | 7-274060 A | 10/1995 | |
| JP | 7-274108 A | 10/1995 | |
| JP | 7-295873 A | 11/1995 | |
| JP | 8-32847 A | 2/1996 | |
| JP | 8-502840 A | 3/1996 | |
| JP | 8-111845 A | 4/1996 | |
| JP | 8-114849 A | 5/1996 | |
| JP | 8-116476 A | 5/1996 | |
| JP | 8-140025 A | 5/1996 | |
| JP | 8-147952 A | 6/1996 | |
| JP | 8-205014 A | 8/1996 | |
| JP | 8-223524 A | 8/1996 | |
| JP | 8-249450 A | 9/1996 | |
| JP | 8-279034 A | 10/1996 | |
| JP | 8-331495 A | 12/1996 | |
| JP | 8-339297 A | 12/1996 | |
| JP | 9-27939 A | 1/1997 | |
| JP | 9-37139 A | 2/1997 | |
| JP | 9-163275 A | 6/1997 | |
| JP | 9-171213 A | 6/1997 | |
| JP | 9-311850 A | 12/1997 | |
| JP | 10-4535 A | 1/1998 | |
| JP | 10-162020 A | 6/1998 | |
| JP | 10-243331 A | 9/1998 | |
| JP | 2000-92439 A | 3/2000 | |
| JP | 2000-510616 A | 8/2000 | |
| JP | 2000-287110 A | 10/2000 | |
| JP | 2001-501416 A | 1/2001 | |
| WO | WO-91/14334 A1 | 9/1991 | |
| WO | WO-92/05652 A2 | 4/1992 | |
| WO | WO-92/05655 A1 | 4/1992 | |
| WO | WO-92/09169 A1 | 5/1992 | |
| WO | WO-92/20186 A1 | 11/1992 | |
| WO | WO-94/23375 A1 | 10/1994 | |
| WO | WO-95/32583 A1 | 11/1995 | |
| WO | WO-96/02106 A1 | 1/1996 | |
| WO | WO-96/29818 A1 | 9/1996 | |
| WO | WO-97/17669 A1 | 5/1997 | |
| WO | WO-97/38510 A1 | 10/1997 | |
| WO | WO-98/14887 A1 | 4/1998 | |

OTHER PUBLICATIONS

"Laboratory Analysis—Data Link: The Future of Camera Technology," *Popular Photography,* Sep. 1993, p. 48.

"PCMCIA for PowerBook 500 Series Computers," *Apple-Facts Online,* 1994, <http://product.info.apple.com/product-info/factsheets/pcmcia.html>.

"YCC Color Space," Oct. 3, 2000, <http://www.aols.com/colorite/yccspace.html>.

"MM4850: Image: Representation," Nov. 4, 1996, <http://www.mcs.csueastbay.edu/~tebo/Classes/4850/Image/representation.html>.

"What Isn't Obvious in the Patent World," PATNEWS, Jan. 30, 1998, email correspondence.

*Laura Lemay's Guide to Sizzling Web Site Design,* Sans.net Publishing, Indianapolis, 1997, pp. 75–77.

"Digitella Technology Solutions Announces ScriptGenerator 1.0, Enabling Users to Easily Develop Software Scripts that Run on Digital Cameras," *PR Newswire,* Oct. 7, 1998.

Grimm, Leigh, "The Manipulation Proclamation," *Photo Trade News,* Feb. 1997, p. 66.

"Kodak DC3400 Zoom—Distinctive New Kodak DC3400 Zoom Digital Camera Offers Easy–to–Use Features, Stylish New Look, All at Affordable Price," *Kodak Press Release,* Aug. 1, 2000.

Hauf et al., "The FlashPix™ Image File Format," *The Fourth Color Imaging Conference: Color Science, Systems and Applications,* 1996, pp. 234–238.

Watanabe et al., "An Image Data File Format For Digital Still Camera," *IS&T's 48th Annual Conference Proceedings,* May 1995, vol. 48, pp. 421–424.

"Disk Drive with Embedded Hyper–Text Markup Language Server," *IBM Technical Disclosure Bulletin,* vol. 38, No. 12, Dec. 1995, p. 479.

"Phaser® 740L Color–Capable Laser Printer," printed Apr. 15, 1999, <http://www.tek.com/Color_Printers/products/740L/740Lfe.htm>.

"What is PhaserLink Software?," printed Apr. 15, 1999, <http://www.tek.com/Color_Printers/userdoc/PShare3/phlink1.htm>.

Corcoran et al., "A Portable Java API Interface to Simplify User Access to Digital Cameras," *IEEE Transactions on Consumer Electronics,* vol. 44, No. 3, Aug. 1998, pp. 686–691.

Mann, Steve, "Headmounted Wireless Video: Computer–Supported Collaboration for Photojournalism and Everyday Use," *IEEE Communications Magazine,* vol. 36, No. 6, Jun. 1998, pp. 144–151.

Williams, Martyn, "Review—NEC PC–DC401 Digital Still Camera," *AppleLink Newbytes,* Mar. 15, 1996.

Peisel, Bill, "Designing the Next Step in Internet Appliances," *Electronic Design,* Mar. 23, 1998, pp. 50, 52, and 56.

Steifield, Edward, "Leveraging Browsers as Universal GUIs," *EE Times,* Issue 932, Dec. 16, 1996, 4 pages.

Newby, Kris, "Apple's New Image–Capture Platform," *Apple Directions,* Aug. 1996.

"Device Drivers via the Access Bus," *IBM Technical Disclosure Bulletin,* vol. 39, No. 1, Jan. 1996, pp. 135–136.

Degann et al., "Still Images Retrieval from a Remote Database: The System Imagine," *Signal Processing: Image Communication,* vol. 5, No. 3, May 1993, pp. 219–234.

"Getting Started With Your Macintosh LC III," cover and inside cover page, p. 21, 1992.

"User's Guide Microsoft Windows & MS–DOS 6," Microsoft Corporation, pp. iii and 71–75, 1993.

Ide, K., "Color Zaurus," Soft Bank KK, Japan, Aug. 15, 1996, pp. 1–111.

Kodak Professional Digital Camera System (DSC100) User's Manual, Eastman, Kodak Company, 1991–1992.

Nikon Digital Camera E100 brochure, Nikon Corporation, Electronic Imaging Division, Sep. 1996.

Canon PowerShot 600 Digital Camera brochure, Canon Computer Systems, Inc., 1996.

Canon PowerShot 350 Digital Camera brochure, Canon Computer Systems, Inc., 1997.

Fujix Digital Card Camera DS–220 brochure, Fuji Photo Film Co., Ltd., 1995.

Epson PhotoPC 500 Color Digital Camera brochure, Seiko Epson Corporation, Oct. 3, 1995.

Okachi et al., "Clear! Simple! Upgraded Digital Photography," *Nikkei Personal Computing,* Nikkei Business Publications, Inc., Japan, Aug. 26, 1996, vol. 271, pp. 236–264.

Kurzidim, "Bildersafari: Foto–Und Videodatenbanken von 100 bis 100000 OM", vol. 9, 1994, pp. 112–114, 116–117, 120–121.

Aker et al., *The Macintosh Bible,* Third Edition, Nov. 1991, pp. 63–64, 324, 931, 945, Goldstein & Blair, Berkeley, California.

*Liquid Crystal Digital Camera QV–10B Owner's Manual,* Casio, 1995, pp. 1–89, Casio Computer Co., Ltd.

Foley et al., *Introduction to Computer Graphics,* 1994, 1990, pp. 505–509, Addison–Wesley Publshing Company, Inc.

Foley et al., *Computer Graphics—Principles and Practice, Second Edition,* Jun. 15, 1990, pp. 754–759, Addison–Wesley Publication Company, Inc.

*Inside Macintosh,* Apple Computer, 1993, pp. 1–5 to 1–8 and 4–1 to 4–46, Apple Computer Inc., Cupertino, California.

Kroiak et al., "A Declaration of Device Independence," *ESD: The Electronic System Design Magazine,* May 1988, pp. 63–65, vol. 18, No. 5.

Melville et al., "An Application Programmer's Interface for Digital Cameras," Imaging Science and Technology's 49th Annual Conference, May 19–24, 1996, The Society for Imaging Science and Technology.

*Picona PC–DC200 PC–DC200K User's Manual,* Feb. 1997, NEC Corporation.

Posnak et al., "An Adaptive Framework for Developing Multimedia Software Components," *Communications of the ACM,* Oct. 1997, pp. 43–47, vol. 40, No. 10, ACM.

*Ricoh Digital Camera RDC–1 Instruction Manual,* Ricoh, Ricoh Americas Corp., Ricoh Co., Ltd Japan.

Shimizu et al., "The Digital Camera Using New Compression and Interpolation Algorithm," IS&T 49th Annual Conference, May 19–24, 1996, pp. 268–272, IS&T, Springfield, Virginia.

Skelton et al., "Design and Development of a Transportable Image Processing and GIS System," *Infrared Image Processing and Enhancement,* May 20–21, 1987, pp. 187–191, vol. 781, SPIE, Bellingham, Washington.

*Texas Instruments TI–85 Guidebook,* 1993, Texas Instruments Incorporated.

*Texas Instruments TI–92 Guidebook,* 1995, Texas Instruments Incorporated.

*VxWorks Programmer's Guide,* 1984–1999, Wind River Systems, Inc.

US 6,177,956 C1

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-18 is confirmed.

New claims 19-74 are added and determined to be patentable.

*19. The digital imaging system of claim 1 wherein the image capture time is a first image capture time and the capturing device comprises an image sensor for capturing light and further comprises electronics to:*

*convert the light that is captured by the image sensor at the first image capture time into the image data for the first captured image; and*

*convert the light that is captured by the image sensor at a second image capture time into the image data for the second captured image.*

*20. The digital imaging system of claim 19 wherein:*

*the settings are first settings, and the processing data that is different than the first processing data is second processing data; and*

*the second processing data includes second settings of the capturing device at the second image capture time wherein the second settings are different than the first settings.*

*21. The digital imaging system of claim 20 wherein the data cell is a first data cell and the manager device is further configured for building a second data cell containing the second processing data.*

*22. The digital imaging system of claim 21 wherein the manager device is further configured for linking the second data cell to the image data for the second captured image.*

*23. The digital imaging system of claim 21 wherein the processing device is further configured for processing the image data for the second captured image using the second processing data within the second data cell.*

*24. The digital imaging system of claim 23 wherein the image data for the second captured image is processed using at least a portion of the second processing data within the second data cell while the image data for the first captured image is still being processed using at least a portion of the first processing data within the first data cell.*

*25. The digital imaging system of claim 23 wherein the first data cell further comprises first status information that is indicative of a current stage of image processing for the image data of the first captured image and first status information is updated as image processing progresses from one stage to another.*

*26. The digital imaging system of claim 23 wherein the first data cell further comprises information that is indicative of an image type of the image data for the first captured image.*

*27. The digital imaging system of claim 23 wherein the first data cell further comprises a watermark to be applied to the image data for the first captured image during processing.*

*28. The digital imaging system of claim 23 wherein the first data cell further comprises information that is indicative of a size of the image data for the first captured image.*

*29. The digital imaging system of claim 23 wherein the first data cell further comprises information that is indicative of at least one of a time and date associated with the first image capture time of the image data for the first captured image.*

*30. The digital imaging system of claim 23 wherein the first data cell further comprises information that is indicative of a location of the image data for the first captured image.*

*31. The digital imaging system of claim 23 wherein the first data cell is a data structure that is accessible by the processing device.*

*32. The digital imaging system of claim 23 wherein the processing device is further configured for compressing the image data of the first captured image to generate first compressed image data.*

*33. The digital imaging system of claim 32 wherein the processing device is further configured for storing the first compressed image data into an image data file.*

*34. The digital imaging system of claim 33 wherein the processing device is further configured for obtaining selected data cell elements from the data cell and storing the selected data cell elements in the image data file in association with the first compressed image data.*

*35. The digital imaging system of claim 34 wherein the selected data cell elements include certain of the first settings.*

*36. The digital imaging system of claim 23 wherein an individualized data cell is provided for each of a plurality of images captured by the capturing device; each individualized data cell includes image capture settings for a corresponding one of the plurality of images; and each of the plurality of images is processed in light of at least one of the image capture settings that is retrieved from within the individualized data cell for the corresponding one of the plurality of images.*

*37. The digital imaging system of claim 36 wherein at least two of the plurality of images are being processed at the same time.*

*38. The digital imaging system of claim 37 wherein the at least two of the plurality of images are being processed concurrently at various processing stages of overall image processing.*

*39. The digital imaging system of claim 23 wherein the image data for the first captured image is processed based on the first settings that are obtained from the first data cell via the first processing data and the image data for the second captured image is processed based on the second settings that are obtained from the second data cell via the second processing data.*

*40. The digital imaging system of claim 1 wherein an individualized data cell is provided for each of a plurality of images captured by the capturing device; each individualized data cell includes image capture settings for a corresponding one of the plurality of images; and each of the plurality of images is processed in light of at least one of the image capture settings that is retrieved from within the individualized data cell for the corresponding one of the plurality of images.*

*41. The digital imaging system of claim 40 wherein at least two of the plurality of images are being processed at the same time.*

*42. The digital imaging system of claim 41 wherein at least two of the plurality of images are being processed concurrently at various processing stages of overall image processing.*

43. The method of claim 7 wherein the image capture time is a first image capture time and the capturing device comprises an image sensor for capturing light and further comprises electronics to:

convert the light that is captured by the image sensor at the first image capture time into the image data for the first captured image; and convert the light that is captured by the image sensor at a second image capture time into the image data for the second captured image.

44. The method of claim 43 wherein:

the settings are first settings, and the processing data that is different than the first processing data is second processing data; and the second processing data includes second settings of the capturing device at the second image capture time, wherein the second settings are different than the first settings.

45. The method of claim 44 wherein the data cell is a first data cell and further comprising building a second data cell containing the second processing data.

46. The method of claim 45 further comprising linking the second data cell to the image data for the second captured image.

47. The method of claim 45 further comprising processing the image data for the second captured image using the second processing data within the second data cell.

48. The method of claim 47 wherein the image data for the second captured image is processed using at least a portion of the second processing data within the second data cell while the image data for the first captured image is still being processed using at least a portion of the first processing data within the first data cell.

49. The method of claim 47 wherein the first data cell further comprises first status information that is indicative of a current stage of image processing for the image data of the first captured image and the first status information is updated as image processing progresses from one stage to another.

50. The method of claim 47 wherein the first data cell further comprises information that is indicative of an image type of the image data for the first captured image.

51. The method of claim 47 wherein the first data cell further comprises a watermark to be applied to the image data for the first captured image during processing.

52. The method of claim 47 wherein the first data cell further comprises information that is indicative of a size of the image data for the first captured image.

53. The method of claim 47 wherein the first data cell further comprises information that is indicative of at least one of a time and date associated with the first image capture time of the image data for the first captured image.

54. The method of claim 47 wherein the first data cell further comprises information that is indicative of a location of the image data for the first captured image.

55. The method of claim 47 wherein the first data cell is a data structure that is accessible by the processing device.

56. The method of claim 47 wherein the processing device is further configured for compressing the image data of the first captured image to generate first compressed image data.

57. The method of claim 56 wherein the processing device is further configured for storing the first compressed image data into an image data file.

58. The method of claim 57 wherein the processing device is further configured for obtaining selected data cell elements from the data cell and storing the selected data cell elements in the image data file in association with the first compressed image data.

59. The method of claim 58 wherein the selected data cell elements include certain of the first settings.

60. The method of claim 47 wherein an individualized data cell is provided for each of a plurality of images captured by the capturing device; each individualized data cells includes image capture settings for a corresponding one of the plurality of images; and each of the plurality of images is processed in light of at least one of the image capture settings that is retrieved from within the individualized data cell for the corresponding one of the plurality of images.

61. The method of claim 60 wherein at least two of the plurality of images are being processed at the same time.

62. The method of claim 61 wherein the at least two of the plurality of images are being processed concurrently at various processing stages of overall image processing.

63. The method of claim 47 wherein the image data for the first captured image is processed based on the first settings that are obtained from the first data cell via the first processing data and the image data for the second captured image is processed based on the second settings that obtained from the second data cell via the second processing data.

64. The method of claim 7 wherein an individualized data cell is provided for each of a plurality of images captured by the capturing device; each individualized data cell includes image capture settings for a corresponding one of the plurality of images; and each of the plurality of images is processed in light of at least one of the image capture settings that is retrieved from within the individualized data cell for the corresponding one of the plurality of images.

65. The method of claim 64 wherein at least two of the plurality of images are being processed at the same time.

66. The method of claim 65 wherein the at least two of the plurality of images are being processed concurrently at various processing stages of overall image processing.

67. The computer-readable medium of claim 13 wherein an individualized data cell is provided for each of a plurality of images captured by the capturing device; each individualized data cell includes image capture settings for a corresponding one of the plurality of images; and each of the plurality of images is processed in light of at least one of the image capture settings that is retrieved from within the individualized data cell for the corresponding one of the plurality of images.

68. The computer-readable medium of claim 67 wherein at least two of the plurality of images are being processed at the same time.

69. The computer-readable medium of claim 68 wherein the at least two of the plurality of images are being processed concurrently at various processing stages of overall image processing.

70. The digital imaging system of claim 1 wherein said processing further comprises, after the image data is processed using the first processing data, compressing the image data to generate a compressed image and storing the compressed image in a memory device.

71. The digital imaging system of claim 70 wherein the data cell is built prior to compressing the image data such that the processing data from the data cell is accessible to the processing device for processing the first image data.

72. The digital imaging system of claim 71 wherein an individualized data cell is provided for each of a plurality of images captured by the capturing device; each individualized data cell includes image capture settings for a corresponding one of the plurality of images; and each of the plurality of images is processed in light of at least one of the

*image capture settings that is retrieved from within the individualized data cell for the corresponding one of the plurality of images.*

*73. The digital imaging system of claim 72 wherein at least two of the plurality of images are being processed at the same time.*

*74. The digital imaging system of claim 73 wherein the at least two of the plurality of images are being processed concurrently at various processing stages of overall image processing.*

\* \* \* \* \*